US012711121B1

(12) United States Patent
Meaden et al.

(10) Patent No.: US 12,711,121 B1
(45) Date of Patent: Aug. 18, 2026

(54) SYSTEM AND METHOD FOR PROVIDING A CONSOLIDATED DATA HUB

(71) Applicant: The PNC Financial Services Group, Inc., Pittsburgh, PA (US)

(72) Inventors: Mark Gregory Meaden, Pittsburgh, PA (US); Chaitanya Vejendla, Pittsburgh, PA (US)

(73) Assignee: THE PNC FINANCIAL SERVICES GROUP, INC., Pittsburgh, PA (US)

( * ) Notice: Subject to any disclaimer, the term of this patent is extended or adjusted under 35 U.S.C. 154(b) by 0 days.

(21) Appl. No.: 18/345,976

(22) Filed: Jun. 30, 2023

Related U.S. Application Data

(60) Provisional application No. 63/486,825, filed on Feb. 24, 2023.

(51) Int. Cl.
*G06F 16/22* (2019.01)

(52) U.S. Cl.
CPC ...... *G06F 16/2282* (2019.01); *G06F 16/2272* (2019.01)

(58) Field of Classification Search
CPC ......................... G06F 16/2282; G06F 16/2272
See application file for complete search history.

(56) References Cited

U.S. PATENT DOCUMENTS 10,049,141 B2 * 8/2018 Prophete ............... G06F 16/248
10,878,126 B1 * 12/2020 Koduru ................. G06F 16/211
11,133,076 B2 9/2021 Karr et al.
2011/0055147 A1 3/2011 Joerg et al.
2012/0144373 A1 6/2012 Cook
2016/0012097 A1 * 1/2016 Lee ......................... G06F 16/25 707/690
2018/0107694 A1 * 4/2018 Dupey ................ G06F 16/2365
2018/0129684 A1 * 5/2018 Wilson .................. G06F 16/254
2019/0147114 A1 * 5/2019 MacLean ............. G06F 3/0484 707/769
2020/0279200 A1 * 9/2020 Makhija ................. G06N 3/049
2020/0372306 A1 11/2020 Nayak et al.

(Continued)

OTHER PUBLICATIONS

Castaño, Rodrigo, et al. "Model checker execution reports." 2017 32nd IEEE/ACM International Conference on Automated Software Engineering (ASE). IEEE, 2017. (11 pgs.).

(Continued)

*Primary Examiner* — Khanh B Pham
(74) *Attorney, Agent, or Firm* — FINNEGAN, HENDERSON, FARABOW, GARRETT & DUNNER, LLP

(57) ABSTRACT

The present disclosure is directed to a system for data consolidation. The system may include processors, servers, and/or storage devices. Processors in the system may be configurable to perform operations like importing data from, transforming the imported data into a plurality of tables, identifying tables comprising outlier attributes, and modifying the identified tables by normalizing or deleting corresponding attributes, Operations of the disclosed systems may also include performing a conformity check on the integration tables, generating two or more data structures arranging tables based on downstream modeling requirements, storing the two or more data structures in the single storage location, and provisioning the one or more data structures for downstream modeling.

17 Claims, 13 Drawing Sheets

(56) References Cited

U.S. PATENT DOCUMENTS

| | | | | |
|---|---|---|---|---|
| 2022/0012170 | A1* | 1/2022 | Mukherjee .......... | G06F 11/3688 |
| 2022/0318573 | A1 | 10/2022 | Smith et al. | |
| 2023/0351523 | A1* | 11/2023 | Sigal ...................... | G06N 3/096 |

OTHER PUBLICATIONS

Gfeller, Martin, and Thomas Hardjono. "Privacy and Security Requirements for a Digital Data Hub." (2021). (17 pgs.).

Gadepally, Vijay, and Jeremy Kepner. "Technical Report: Developing a Working Data Hub." arXiv preprint arXiv:2004.00190 (2020). (33 pgs.).

Gudivada, Venkat, Amy Apon, and Junhua Ding. "Data quality considerations for big data and machine learning: Going beyond data cleaning and transformations." International Journal on Advances in Software 10.1 (2017): 1-20. (20 pgs.).

* cited by examiner

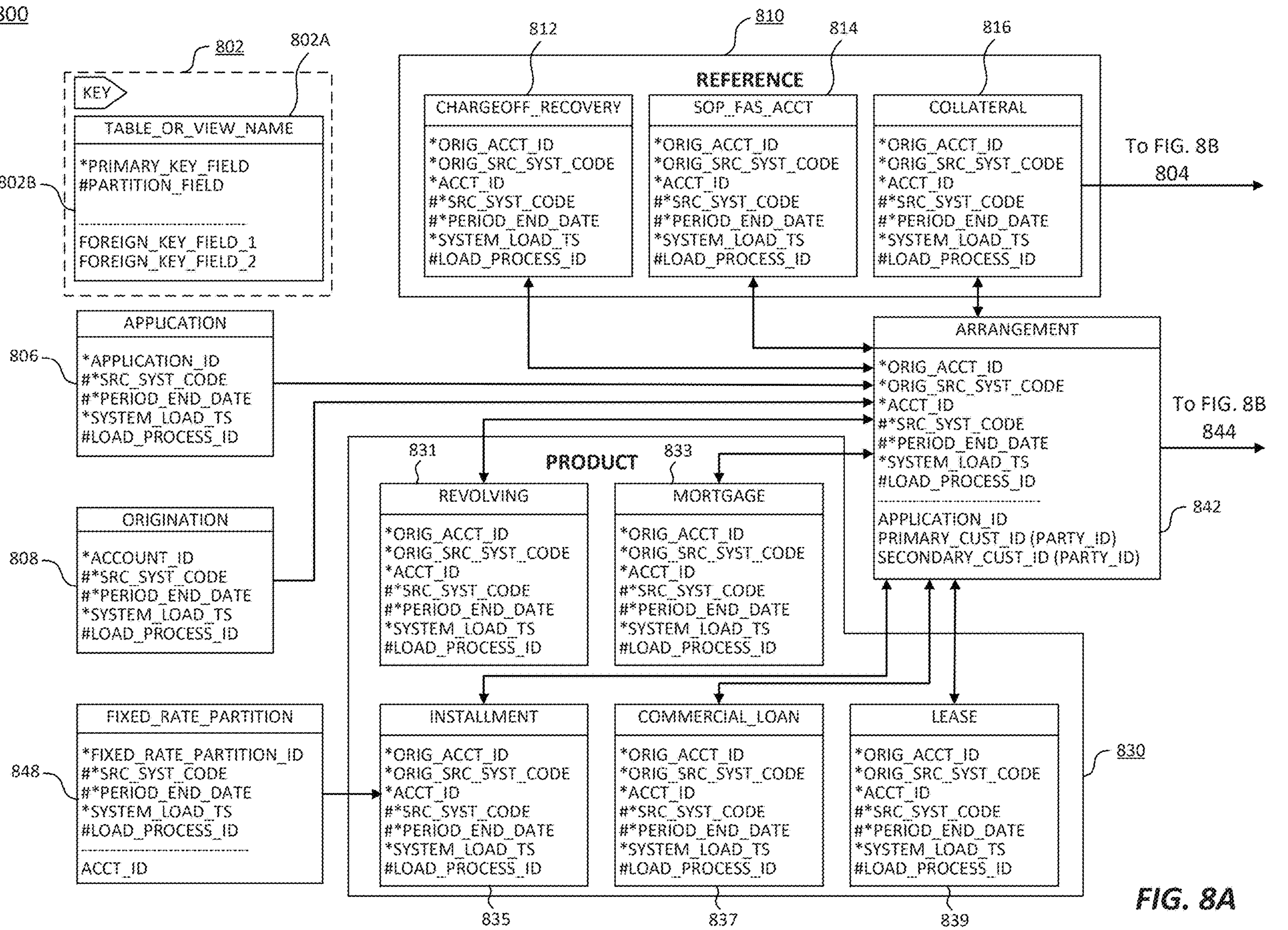
800
802
802A
KEY
TABLE_OR_VIEW_NAME
*PRIMARY_KEY_FIELD
#PARTITION_FIELD
FOREIGN_KEY_FIELD_1
FOREIGN_KEY_FIELD_2
802B
810
REFERENCE
812
CHARGEOFF_RECOVERY
*ORIG_ACCT_ID
*ORIG_SRC_SYST_CODE
*ACCT_ID
#*SRC_SYST_CODE
#*PERIOD_END_DATE
*SYSTEM_LOAD_TS
#LOAD_PROCESS_ID
814
SOP_FAS_ACCT
*ORIG_ACCT_ID
*ORIG_SRC_SYST_CODE
*ACCT_ID
#*SRC_SYST_CODE
#*PERIOD_END_DATE
*SYSTEM_LOAD_TS
#LOAD_PROCESS_ID
816
COLLATERAL
*ORIG_ACCT_ID
*ORIG_SRC_SYST_CODE
*ACCT_ID
#*SRC_SYST_CODE
#*PERIOD_END_DATE
*SYSTEM_LOAD_TS
#LOAD_PROCESS_ID
To FIG. 8B
804
806
APPLICATION
*APPLICATION_ID
#*SRC_SYST_CODE
#*PERIOD_END_DATE
*SYSTEM_LOAD_TS
#LOAD_PROCESS_ID
ARRANGEMENT
*ORIG_ACCT_ID
*ORIG_SRC_SYST_CODE
*ACCT_ID
#*SRC_SYST_CODE
#*PERIOD_END_DATE
*SYSTEM_LOAD_TS
#LOAD_PROCESS_ID
APPLICATION_ID
PRIMARY_CUST_ID (PARTY_ID)
SECONDARY_CUST_ID (PARTY_ID)
842
To FIG. 8B
844
808
ORIGINATION
*ACCOUNT_ID
#*SRC_SYST_CODE
#*PERIOD_END_DATE
*SYSTEM_LOAD_TS
#LOAD_PROCESS_ID
PRODUCT
831
REVOLVING
*ORIG_ACCT_ID
*ORIG_SRC_SYST_CODE
*ACCT_ID
#*SRC_SYST_CODE
#*PERIOD_END_DATE
*SYSTEM_LOAD_TS
#LOAD_PROCESS_ID
833
MORTGAGE
*ORIG_ACCT_ID
*ORIG_SRC_SYST_CODE
*ACCT_ID
#*SRC_SYST_CODE
#*PERIOD_END_DATE
*SYSTEM_LOAD_TS
#LOAD_PROCESS_ID
848
FIXED_RATE_PARTITION
*FIXED_RATE_PARTITION_ID
#*SRC_SYST_CODE
#*PERIOD_END_DATE
*SYSTEM_LOAD_TS
#LOAD_PROCESS_ID
ACCT_ID
INSTALLMENT
*ORIG_ACCT_ID
*ORIG_SRC_SYST_CODE
*ACCT_ID
#*SRC_SYST_CODE
#*PERIOD_END_DATE
*SYSTEM_LOAD_TS
#LOAD_PROCESS_ID
835
COMMERCIAL_LOAN
*ORIG_ACCT_ID
*ORIG_SRC_SYST_CODE
*ACCT_ID
#*SRC_SYST_CODE
#*PERIOD_END_DATE
*SYSTEM_LOAD_TS
#LOAD_PROCESS_ID
837
LEASE
*ORIG_ACCT_ID
*ORIG_SRC_SYST_CODE
*ACCT_ID
#*SRC_SYST_CODE
#*PERIOD_END_DATE
*SYSTEM_LOAD_TS
#LOAD_PROCESS_ID
839
830
FIG. 8A

SYSTEM AND METHOD FOR PROVIDING A CONSOLIDATED DATA HUB

CROSS-REFERENCE TO RELATED APPLICATIONS

The present application claims the benefit of priority of U.S. Provisional Application No. 63/486,825, filed Feb. 24, 2023. The foregoing application is incorporated herein by reference in its entirety.

TECHNICAL FIELD

The present disclosure relates generally to systems and methods for providing a consolidated data hub. More specifically, and without limitation, this disclosure relates to consolidating a plurality of data sources to facilitate training, generation, updating, and use of data models. The disclosure includes systems and methods for ingesting data from the plurality of data sources, transforming data into normalized data structures (e.g., object tables), integrating the data into the consolidated data hub, and preparing the data for consumption by users of the consolidated data hub.

BACKGROUND

In some current data mart solutions (a data mart being a subset of a data warehouse relating to a particular subject area and a data warehouse being an enterprise-wide data storage solution), there may be multiple discrete data marts. For example, different data marts may exist with some overlapping data or no overlapping data between them. Consumers of data from the data marts may need to access several different data marts to perform their preferred or required analyses of the data. This may involve specific data aggregation and/or manipulation performed by each user, depending on how the user is going to use the data. Having each user perform these tasks separately for their own use is time-consuming and may in many instances be duplicative work.

Some other existing problems with current data mart solutions include the following. The data sources may not be consolidated (e.g., it may be more difficult for a user to find the data they want). It may be difficult for the data owner(s) to determine patterns of data consumption. Different data marts may use different formats and/or data structures that make it difficult to compare, aggregate, or manipulate data.

Further, if there are data issues, it may be difficult to determine if the data issues are present at the data source or the data consumption. As used herein the term "data issues" may refer to missing data (e.g., one or more missing data elements) or data that is not properly set up for the desired data consumption (e.g., formatting errors, missing data fields). There may not be sufficient data quality controls (e.g., input/output or execution controls) established at the consumption and distribution layers of data. There may be insufficient controls relating to regulatory reporting requirements on the data or who consumes the data. For example, some data marts may not include "production quality" data, such that it may be difficult to prove the source and/or accuracy of the data.

The disclosed systems, apparatuses, devices, and methods are directed to overcoming these and other drawbacks of existing systems and for improved systems and methods for developing digital experience applications.

SUMMARY

In view of the foregoing, embodiments of the present disclosure provide computer-implemented systems and methods for providing a consolidated data hub that facilitates use (e.g., data modeling and/or data analysis) by users of the consolidated data hub (also referred to herein as downstream users). In some embodiments, data is gathered from a plurality of sources, transformed into integration tables (having a common format such as objects with key—attributes), and stored in a single storage location. The data in the single storage location may be curated by, for example, executing functions to identify outliers in the data that may be identified and normalized or removed from the data. Further, different functions for data quality check may be performed on the data by executing a data conformity job or rule, wherein the data conformity job automatically adjusts the data based on its data type. The data may be structured based on a downstream user's requirements and may be provisioned to the downstream user through different methods including, for example, an application programing interface and/or access to secure repositories.

One aspect of the present disclosure is directed to a system for data consolidation. The system may include one or more processors and one or more storage devices storing instructions that, when executed, configure the one or more processors to perform operations. The operations may include importing data from a plurality of sources to a single storage location through at least one iterative import job, transforming the imported data into a plurality of integration tables (the plurality of integration tables having an indexing key and an attribute), and identifying integration tables comprising outlier attributes. The operations may also include modifying the identified integration tables by normalizing or deleting corresponding attributes and, after modifying the identified integration tables, performing a conformity check on the integration tables by executing a conformity job, where the conformity job includes a script that adjusts attributes in the plurality of integration tables based on values in a control table with matching indexing key. Moreover, the operations may include generating two or more data structures arranging at least a portion of the plurality of integration tables based on downstream modeling requirements; storing the two or more data structures in the single storage location; and provisioning the one or more data structures for downstream modeling.

Another aspect of the present disclosure is directed to a method for data consolidation. The method may include importing data from a plurality of sources to a single storage location through at least one iterative import job, transforming the imported data into a plurality of integration tables (the plurality of integration tables having an indexing key and an attribute), and identifying integration tables comprising outlier attributes. The method may also include modifying the identified integration tables by normalizing or deleting corresponding attributes and, after modifying the identified integration tables, performing a conformity check on the integration tables by executing a conformity job, where the conformity job comprising a script that adjusts attributes in the plurality of integration tables based on values in a control table with matching indexing key. Further, the method may also include operations or steps for generating two or more data structures arranging at least a portion of the plurality of integration tables based on downstream modeling requirements, storing the two or more data structures in the single storage location, and provisioning the one or more data structures for downstream modeling.

Yet another aspect of the present disclosure is directed to a server having at least one processor, a storage location connected to the at least one processor; and a remote access card connected to the at least one processor and the storage location. The processor may be configured to import data from a plurality of sources to the storage location by connecting to the plurality of data sources through the remote access card and implementing a plurality of import jobs, transform the imported data into a plurality of tables, the plurality of tables having an indexing key and an attribute, and identify integration tables comprising outlier attributes. The processor may also be configured to modify the identified integration tables by normalizing or deleting corresponding attributes, perform a conformity check on the tables by executing a conformity job (where the conformity job includes a script that adjusts attributes in the plurality of integration tables based on values in a control table with matching indexing key), and generate two or more data structures arranging at least a portion of the plurality of integration tables based on downstream modeling requirements. The processor may also be configured to store the two or more data structures in the storage location and expose the one or more data structures for downstream modeling.

It is to be understood that the foregoing general description and the following detailed description are exemplary and explanatory only, and are not restrictive of the disclosed embodiments.

BRIEF DESCRIPTION OF DRAWINGS

The accompanying drawings, which comprise a part of this specification, illustrate several embodiments and, together with the description, serve to explain the principles and features of the disclosed embodiments. In the drawings:

FIG. 8A is a first part of a first exemplary object arrangement of integration and/or consolidation tables and relations in a consolidated data hub, consistent with disclosed embodiments.

DETAILED DESCRIPTION

Figure 1:
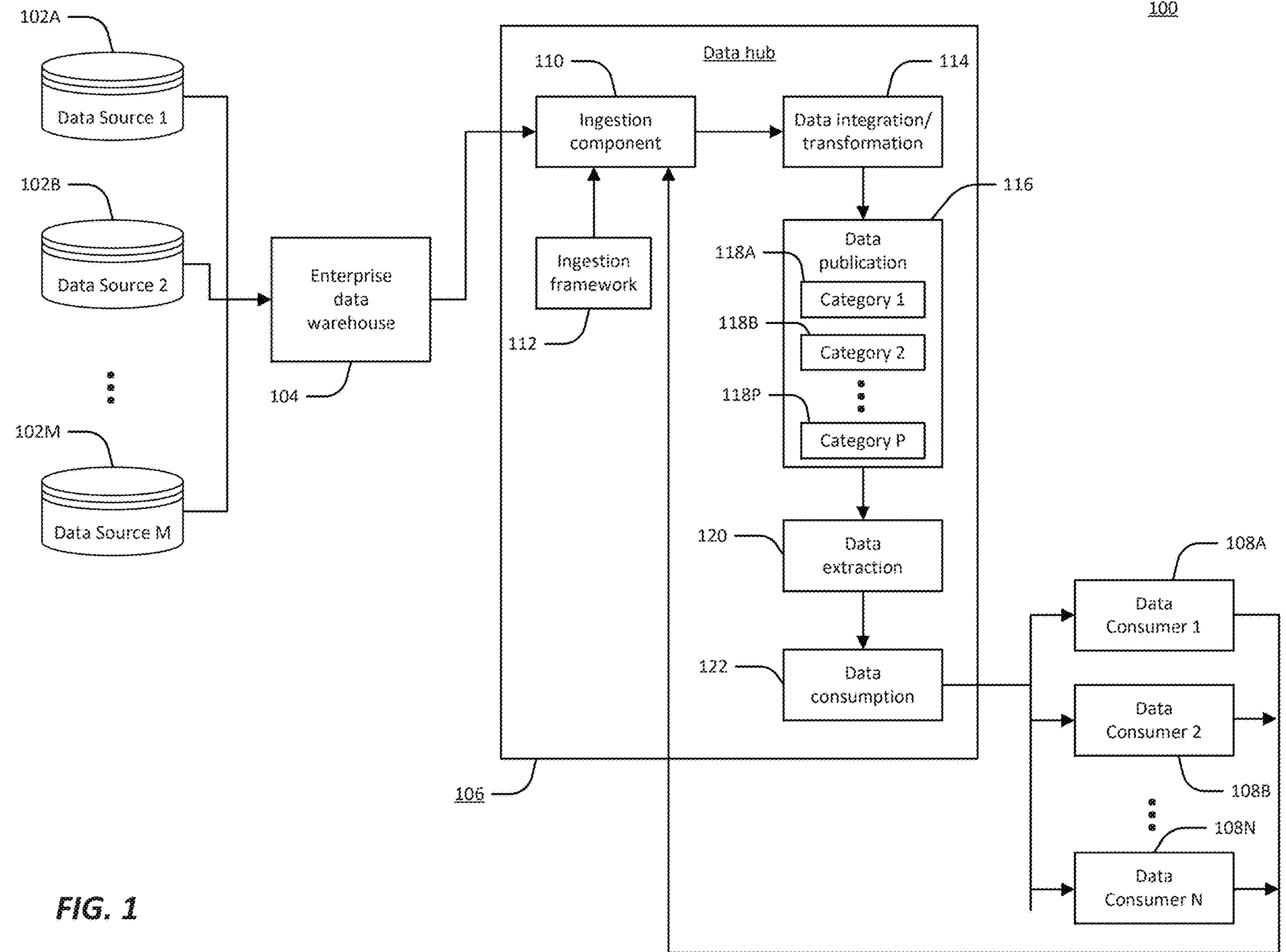
FIG. 1 is a diagram of an exemplary system including a consolidated data hub, consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. The following detailed description is not limited to the disclosed embodiments and examples.

Some embodiments of the present disclosure are directed to systems and methods for a data architecture and sourcing strategy employing a single central data source, or data hub, that produces controlled and quality data and provisions data for downstream users. In some embodiments, the data hub may be used for model development, monitoring, reporting, and analytics. Further, the data hub may minimize the need for modelers to aggregate, structure, and manipulate the data sets before using the data for model development or monitoring. Additionally, or alternatively, the data hub may provision the data for model usage by structuring the data based on consumption needs. Moreover, data hub implementations may structure data into object tables, generated for specific data users and based on specific requests.

In certain embodiments of the disclosed systems and methods, the data is structured the same way for all users of the data hub to create uniform data. In other embodiments, however, the data hub may structure data into multiple object tables based on how the user is going to use the data. For example, a data user may select a first table that is structured based on a lifecycle stage of a service (e.g., loan origination, loan servicing, delinquency, loss mitigation, or loan modification) or may select a second table that is structured based on an asset class of the service (e.g., home equity, mortgage, automobile loans, credit cards, or business banking).

Further, some embodiments of the disclosed systems and methods may improve the operation of computer functionality by providing a particular structure and configuration of servers for a consolidated data hub that facilitates data analysis or modeling. For example, disclosed systems and methods may provide improved functionality in data consolidation, facilitate identification of data issues, and enable recurrent data verification and quality checks that improve the accuracy and reliability of downstream models or analysis.

Moreover, the disclosed systems and methods may improve interfacing between downstream data users and data sources. The generation of consolidated data with specific data structures may facilitate interfacing of downstream users with consolidated data having accessible information. For example, in some embodiments the disclosed systems and methods for a consolidated data hub may facilitate the development of dashboards and interfaces that improve accessibility of data specifically curated for downstream modeling.

Further, the disclosed systems and methods may also improve network usage and reduce network congestion during data analysis and/or data modeling operation. For example, the consolidation of data may minimize queries or access requests to data sources, reducing network congestion and improving overall network availability. Moreover, disclosed systems and method may facilitate execution of automation tools for data check, model updating, triggered retraining, and data curating by having a centralized location to minimize overloading different independent sources while maintaining uniformity in kept records.

Some of the disclosed embodiments provide systems and methods for establishing a single source of data for downstream users that collect information from different sources. In such embodiments, data may be gathered from a plurality of sources in a single storage location. During the importation of data, outliers in the data may be identified and then normalized or removed. In some embodiments, disclosed systems may perform data quality checks by executing a data conformity rule, wherein the data conformity rule automatically adjusts the data based on its data type. In such embodiments, a data quality dashboard may be created and configured to display results of the data quality check performed on the data (e.g., providing statistical information of the data that was modified, the outlier data, and/or selected ranges). The data may be structured based on a downstream user's requirements and is provisioned to the downstream user.

Using the data hub may also provide the ability to refresh historical data, based on updates to the data and retrain data models. For example, if a new attribute is added to the data (e.g., adding one or more COVID-19 related fields to the data), the new attribute may be added to all existing data and trigger model retraining operations. In such embodiments, in an event that the new attribute does not apply to the data, that attribute may be left blank or have a null associated with it on object tables. For example, a service that was fully paid in 2017 would not need to have a COVID-19 related field associated with it, but for formatting and continuity purposes such data may have the COVID-19 relate field and a blank value or a null value associated with that field.

Data attributes for modeling may be organized, for example, by asset class (e.g., home equity, mortgage, automobile loans, credit cards, or business banking) or by lifecycle (e.g., loan origination, loan servicing, delinquency, loss mitigation, or loan modification). It is noted that other asset classes and lifecycle steps may be used within the scope of this disclosure.

Reference will now be made to the disclosed embodiments, examples of which are illustrated in the accompanying drawings. Literals used to reference individual elements in the figures, e.g., A or B, do not specify the number of an element or the total number of elements. Instead, they are variable references that indicate a variable element number and a variable number of total elements. For example, literal B does not indicate that the element with the "B" literal is the 2nd one. Instead, B is a variable reference that could indicate any integer number.

FIG. 1 is a diagram of an exemplary system 100 including a consolidated data hub, according to some embodiments. System 100 includes a plurality of data sources 102A, 102B, . . . , 102M. The data sources 102A-102M may include any type of data storage, such as a database (e.g., current data stored in a relational database with fixed rows and columns or a non-relational database that can store data according to various models, such as JavaScript Object Notation (JSON) or key-value pairs), a data warehouse (e.g., current data and historical data from various systems that has been converted to a particular format for analytics), or a data lake (e.g., a data repository including various sources that store the data in its original format, such as structured data, semi-structured data, or unformatted data).

The data sources 102A-102M feed into an enterprise data warehouse 104. The enterprise data warehouse 104 may be a collection of one or more databases that store an enterprise's data. In some embodiments, the data in the enterprise data warehouse 104 may be extracted from the data sources 102A-102M, loaded into the enterprise data warehouse 104, and transformed within the enterprise data warehouse 104 into a different format than the source format. This process may be referred to as an "extract, transform, load" (ETL) process.

The enterprise data warehouse 104 may feed data into a data hub 106. Data hub 106 may be used to manage the flow and exchange of data from the original source (e.g., data sources 102A-102M) to an endpoint for the data (e.g., data consumers 108A, 108B, . . . 108N). Data hub 106 may be viewed as a "trusted source" of data and may provide the trusted data to several different applications, end uses, or end users.

An ingestion component 110 may receive data from the enterprise data warehouse 104. The ingestion component 110 may operate in real-time (e.g., ingesting a data feed or a data stream) or may operate in batches (e.g., ingesting a "chunk" of data at periodic intervals, either manually started or automatically scheduled). An ingestion framework 112 may provide the rules for the ingestion component 110 to ingest the data from the enterprise data warehouse 104. For example, the ingestion framework 112 may provide rules on how to ingest the data from the enterprise data warehouse 104 into internal storage (not shown in FIG. 1) in the data hub 106 (e.g., a database), how to ingest data from one or more of the data sources 102A-102M if the data is not available in the enterprise data warehouse 104, and how to partition (e.g., store) the data in the internal storage in the data hub 106.

The data ingested by the ingestion component 110 may be passed to a data integration/transformation component 114. The process of data integration may take several different data sources and may present a single view of the data to an end user (e.g., data consumers 108A-108N). To achieve the data integration, the data may also be transformed from its source format or structure (i.e., its originally stored format or structure) into a different format or structure.

A data publication component 116 receives the transformed data from the data integration/transformation component 114. The data publication component 116 may store the data in a plurality of categories (e.g., categories 118A, 118B, . . . , 118P). The categories 118A-118P may be based on any logical division desired by an administrator of data hub 106. For example, the categories 118A-118P may relate to categories of data to be used by data consumers 108A-108N. In an embodiment used in a financial loan setting, the categories 118A-118P may relate to different life cycle stages of a service. For example, there may be different categories for loan application, loan origination, loan servicing, or loan exiting. Other categories are contemplated within the scope of this disclosure.

A data extraction component 120 extracts data from the categories 118A-118P through, for example, views or persistent tables. For example, a view may be based on a query executed on the data.

A data consumption component 122 may receive the data from the data extraction component 120 and may distribute the data to one or more data consumers 108A-108N. For example, the data may be pushed (e.g., sent) to the data consumers on a periodic basis (e.g., monthly).

In some embodiments, the data consumers 108A-108N may discover that a data element in the received data contains a data issue. As used herein, the term "data issue" includes an error in the data (e.g., a missing value or a number formatted as a string) or a value that is an outlier compared to the rest of the data. The data issue may be corrected by one or more of the data consumers and fed back into the data hub 106 (via ingestion component 110) along with a change history of the changed data element. This data element along with its change history may be integrated into the data in the data hub 106 and later distributed to data consumers (either the same data consumer that corrected the defect or another data consumer).

Figure 2:
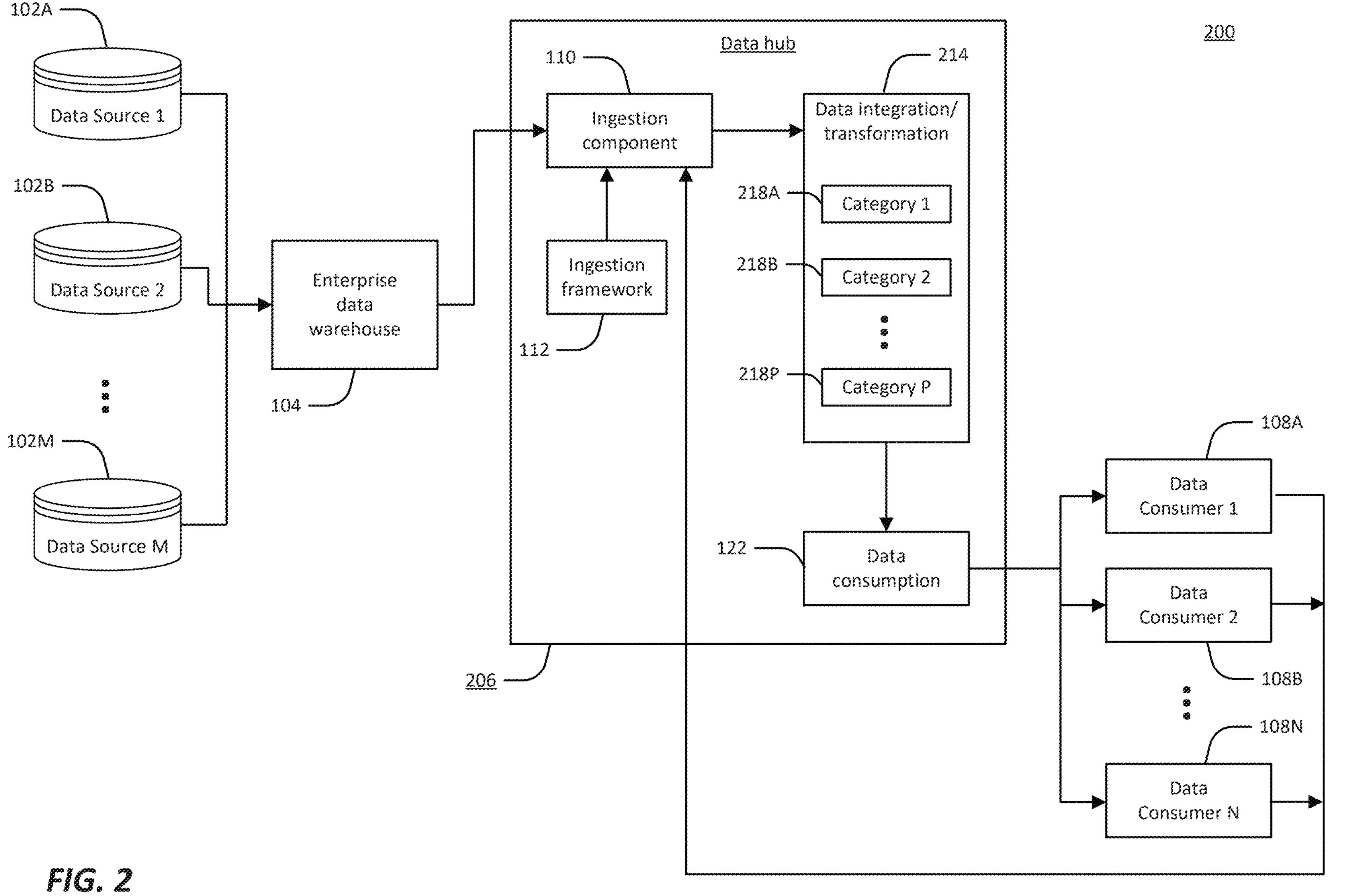
FIG. 2 is a diagram of another exemplary system including a consolidated data hub, consistent with disclosed embodiments.

FIG. 2 is a diagram of an exemplary system 200 including a consolidated data hub, according to some embodiments. Elements of system 200 that are the same as elements of the system 100 (i.e., data sources 102A-102M, enterprise data warehouse 104, data consumers 108A-108N, ingestion component 110, ingestion framework 112, and data consumption component 122) function in a similar manner as described in connection with FIG. 1.

System 200 includes data hub 206 with a data integration/transformation component 214. Data integration/transformation component 214 may receive the data from the ingestion component 110. The process of data integration takes several different data sources and presents a single view of the data to an end user (e.g., data consumers 108A-108N). To achieve the data integration, the data may also be transformed from its source format or structure (i.e., its originally stored format or structure) into a different format or structure. For example, as further discussed in connection with FIGS. 8-9, data may be transformed and sorted in indexed object table.

Data integration/transformation component 214 may additionally, or alternatively, store the data in a plurality of categories (e.g., categories 218A, 218B, . . . , 218P). The categories 218A-218P may be based on any logical division desired by an administrator of data hub 206. For example, the categories 218A-218P may relate to categories of data to be used by data consumers 208A-208N. In an embodiment used in a financial loan setting, the categories 218A-218P may relate to different life cycle stages of a loan product. For example, there may be different categories for loan application, loan origination, loan servicing, or loan exiting. Other categories are contemplated within the scope of this disclosure. The system 200 otherwise functions in a similar manner as the system 100.

Figure 3:
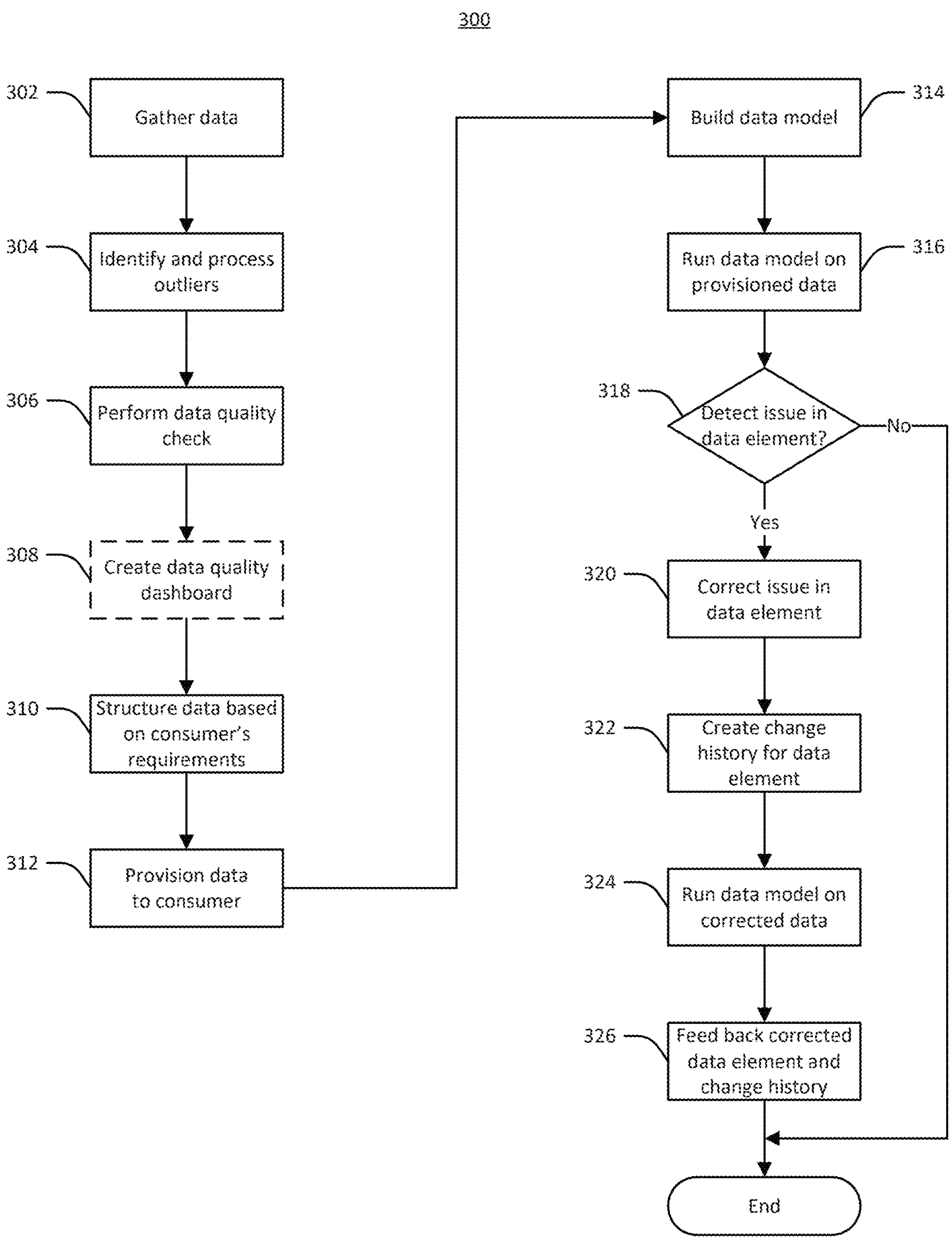
FIG. 3 is a flowchart of an exemplary method for consuming data from a consolidated data hub and correcting data defects, consistent with disclosed embodiments.

FIG. 3 is a flowchart of an exemplary method 300 for consuming data from a consolidated data hub and correcting data defects, according to some embodiments. Method 300 may be performed by system 100 or system 200.

Data may be gathered from a plurality of sources (e.g., data sources 102A-102M) (step 302). In some embodiments, elements of the gathered data may be tokenized (i.e., replaced with a different value to hide sensitive data) before further processing is performed on the data. The data is tokenized on a per-data element basis (e.g., per instance), based on privacy rules. For example, only personally identifiable information (PII) may need to be tokenized and not the entire table that includes the PII.

The gathered data may be reviewed to identify outliers in the data (step 304). For example, an outlier in the data may be a data point that appears to be divergent from the other data points. In this sense, determining whether a data point is "divergent" may be based on the set of data points and a predetermined distance from what may be considered to be a "normal" sample for the set of data points. Any identified outliers may be normalized (e.g., if the data includes numerical values, an outlier may be scaled based on the rest of the data in the set) or removed from the data.

A data quality check may be performed on the data by executing a data conformity rule (step 306). The data conformity rule may automatically adjust the data (e.g., scale, normalize, or transform) based on its data type. In some embodiments, the data conformity rule may flag the rule violation to be handled manually by an operator. For example, the data conformity rule may analyze the data to determine whether one or more data elements are outside of predetermined ranges. As another example, the data conformity rule may analyze the data to determine whether the data is the correct type of data based on the model in which the data is to be used (e.g., when running the model on the data, the resulting pattern produced by the model may not appear to be accurate). As another example, the data conformity rule may be programmed with parameters to compare the data elements against the rules and to identify any outlier data elements.

A data quality dashboard is optionally created and is configured to display the results of the data quality check performed on the data (step 308; shown in dashed outline). For example, as discussed in connection with FIG. 10, a dashboard may be displayed to a user via a user interface of a device used by the user to access the system (e.g., a Web-based interface or an application-based interface). In some embodiments, the dashboard may include a risk and control self-assessment data quality dashboard.

In some embodiments, data may be structured based on the requirements of the downstream consumers (e.g., data consumers 108A-108N) (step 310). For example, the data may be structured by placing the data into one or more categories (e.g., categories 118A-118P or 218A-218P). In an embodiment used in a financial loan setting, the categories 218A-218P may relate to different life cycle stages of a loan product. For example, there may be different categories for loan application, loan origination, loan servicing, or loan exiting. Different data consumers may be interested in different aspects of the life cycle stage of the loan product. Further, a data consumer that is processing loan applications may only be interested in the loan application data, which may be filtered and/or formatted specially for that data consumer such that the data consumer may not need to perform additional filtering or formatting of the loan application data prior to using it.

In some embodiments, structuring the data may include maintaining a change history of the data elements with the data (e.g., generating change logs), as will be described in further detail below. In some embodiments, structuring the data may include structuring the data in a first structure for a first entity and structuring the data in a second structure for a second entity. For example, the data in the first structure may be the same as the data in the second structure. As another example, a portion of the data in the first structure may be the same as a portion of the data in the second structure (i.e., only a portion of the data is the same between the first structure and the second structure).

The data is then provisioned to the data consumers (step 312). In some embodiments, the data may be pushed to the data consumer. For example, as further discussed in connection with FIG. 11, data may be made available for the data consumer to retrieve on demand from the data hub (e.g., data hub 106 or data hub 206).

In one use of the data obtained from the data hub, the data consumer may build a data model based on the provisioned data (step 314). The data consumer may run the data model on the provisioned data (step 316). For example, as further discussed in connection with FIG. 11, data hub 106 may provide "production quality data" to use in existing data models. Data models may include machine-learning models, analytics models, and/or regulatory models that may be used to show compliance with certain regulations. Using the data from the data hub (e.g., the production quality data), this may help to ensure the quality of the data being consumed for training or developing the models.

Based on the results of running the data model on the provisioned data, it may be determined whether an issue in any of the data elements is detected (step 318). If no defects are detected (step 318, "no" branch), the method 300 may then exit.

If an issue in a data element is detected (step 318, "yes" branch), then the issue in the data element may be corrected (step 320). In some embodiments, the issue in the data element may be corrected by the data consumer. For example, certain data issues may be able to be corrected by the data conformity rules as described above. As another example, a data issue may be automatically detected (i.e., flagged) and the correction may require manual intervention by the data consumer.

After the defect in the data element is corrected, a change history for the data element may be created (step 322). The change history for the data element may include the correction to the data defect made in step 320. In the event that there have been other changes made to the data element, a change history may already exist, and the latest change may be added to the existing change history.

In some embodiments, the data model is run on the corrected data set (including the data element corrected in step 320) (step 324). The corrected data element and its associated change history are fed back to the data hub (e.g., data hub 106 or data hub 206) (step 326). In one embodiment, the corrected data element and the change history are fed back to the data hub via the ingestion component (e.g., ingestion component 110). In another embodiment, the corrected data element and the change history are fed back to the data hub via the data integration/transformation component (e.g., data integration/transformation component 114 or data integration/transformation component 214).

Figure 4:
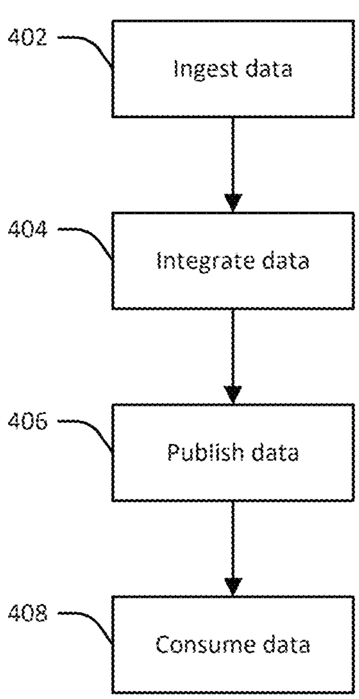
FIG. 4 is a flowchart of another exemplary method for consuming data from a consolidated data hub, consistent with disclosed embodiments.

FIG. 4 is a flowchart of an exemplary method 400 for consuming data from a consolidated data hub, according to some embodiments. The method 400 may be performed by system 100 or system 200.

Data may be ingested from a plurality of sources (e.g., data sources 102A-102M) in a single storage location (e.g., enterprise data warehouse 104 or data hub 106) (step 402). The data is integrated in the single storage location (e.g., data hub 106) (step 404). The process of data integration may take several different data sources and may present a single view of the data to an end user (e.g., data consumers 108A-108N). To achieve the data integration, the data may also be transformed from its source format or structure (i.e., its originally stored format or structure) into a different format or structure. In some embodiments, integrating the data may include any one or more of: sorting the data, categorizing the data, or transforming the data.

After integration, the data may be published from the single storage location (e.g., data hub 106) to one or more downstream consumers (e.g., data consumers 108A-108N) (step 406). The data may be published from the single storage location via categories 118A-118P and a data consumption component (e.g., data consumption component 122) in the data hub (e.g., data hub 106). In some embodiments, publishing the data includes preparing the data for use by the downstream consumer. For example, the data hub may receive one or more requirements from the downstream consumer about the data and the data may be filtered based on the one or more requirements.

The data may be consumed or utilized by the downstream consumer (step 408). In some embodiments, consuming the data may include executing an existing machine learning model on the data or developing a new machine learning model based on the data.

Figure 5:
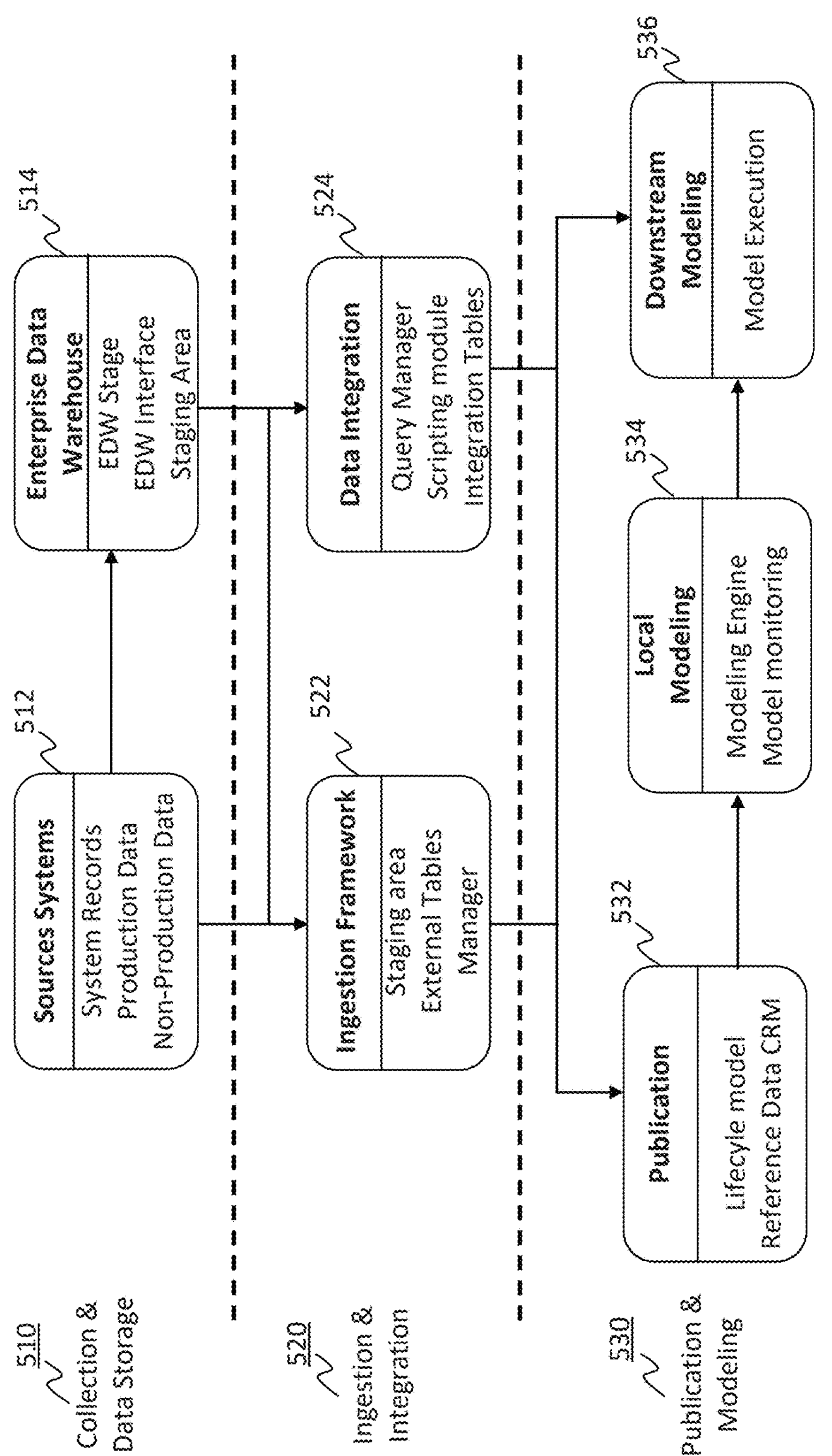
FIG. 5 is an exemplary block diagram describing stages and modules for generating a consolidated data hub, consistent with disclosed embodiments.

FIG. 5 is an exemplary block diagram 500 describing stages and modules for generating a consolidated data hub, consistent with disclosed embodiments. In some embodiments, system 100 (FIG. 1) may implement the functions and processes described in block diagram 500. For example, blocks in FIG. 5 may be implemented by one or more of data sources 102A-102M, enterprise data warehouse 104, data consumers 108A-108N, ingestion component 110, ingestion framework 112, and/or data consumption component 122. The description below of block diagram 500 describes embodiments in which system 100 implement operations. However, similar descriptions apply for other system implementations. For example, data hub 206 may implement the functions of block diagram 500.

Block diagram 500 may divide functions in stages. A first stage 510 in which the system collects and store data from different data sources. A second stage 520 in which the system ingests (or processes) collected data and applies transformations for data integration. And a third stage 530 in which the system publishes and or models data.

As shown in FIG. 5, first stage 510 may involve source systems 512 and an enterprise data warehouse 514. Source systems 512 may include data sources 102A-102M (FIG. 1) and/or additional sources of information accessible to the system, including but not limited to online sources. As further, discussed below in connection with FIG. 6, source systems 512 may include internal databases (both production and non-production databases), internal records, and external sources including online crawled data. Production or "live" databases in source systems 512 may contain data used in active tasks (e.g., actively used for resolving user queries) and maybe dynamic, creating, updating, and/or deleting records. In some embodiments, production databases are accessed directly (e.g., data hub 206 may query directly production databases). In other embodiments, however, production databases may not be accessible to system 200 and a copy may be created periodically (e.g., in non-production databases) to avoid service interruption. Non-production databases in source systems 512 may be contained or "sand boxed" databases used for testing or early deployments.

Enterprise data warehouse 514, or EDW 514, may include staging and interfacing modules for collecting and storing data from data sources. EDW 514 may include operational and transactional systems such as mobile systems, online systems, systems providing data for Internet of Things (IoT) devices, systems providing and/or supporting finance apps, and customer relationship management (CRM) applications.

EDW 514 may also include a staging area for data aggregation and cleaning. The data staging area may include a data staging server software and a data store archive (repository) of the outcomes of the extraction, transformation, and loading activities in the data warehousing process. In the data staging area, archival repository stores may be cleaned (e.g., remove extraneous data), converted, and loaded into data marts and data warehouses. In some embodiments, data staging in EDW 514 may be formed by copying data pipelines to collect and store raw/unprocessed data. In EDW 514 data may be organized in database tables, files in a cloud storage system, and other staging regions.

In some embodiments, the staging area in EDW 514 may label different data with metadata to associate raw data from Online Transaction Processing (OLTP) systems. For example, EDW 514 may put indicators and/or pointers to sort influx from data pipelines in the staging area. Additionally, or alternatively, EDW 514 may generate new types of data as summary files for data that pre-compute frequent, time-consuming processes so that data can be pass down faster while minimizing network congestion.

As shown in FIG. 5, source systems 512 may connect to EDW 514. For example, EDW 514 may have the ability to query source systems 512 periodically. Alternatively, or additionally, EDW 514 may act as middleman between source systems 512 and other elements of system 100 (as shown in FIG. 1) and collect data from the data pipeline.

As shown in FIG. 5, second stage 520 may include an ingestion framework 522 and data integration 524. Ingestion framework 522 may include staging areas and table management for processing data. Ingestion framework 522 may be connected to source systems 512 and/or EDW 514. In some embodiments, ingestion framework 522 may only connect to EDW 514 to minimize network congestion. In other embodiments, however, ingestion framework 522 may connect directly to one or more of source systems 512. For example, dynamic sources or sources highly relevant for the consolidation data hub may be connected directly to ingestion framework 522 to expedite integration and/or updates.

Ingestion framework 522 may be configured to process data from a plurality of sources. As further discussed below in connection with FIGS. 6 and 7, ingestion framework 522 may be configured in individual purpose services to match specified connectivity, data format, data structure, and data velocity requirements of database sources, streaming data sources, and file sources.

For example, in certain embodiments data ingestion framework 522 may be organized based on the type of source that is being integrated. In such embodiments, ingestion framework 522 may process data from operational database sources (e.g., production databases) through a web migration service that connects to a variety of operational Relational Database Management System (RDBMS) and NoSQL databases and ingest their data into storage. For streaming sources, such as Online Transaction Processing (OLPT), ingestion framework 522 may use streaming data services to receive streaming data from internal and external sources. In such embodiments, ingestion framework 522 may configure Application Programming Interfaces (APIs) to permit collection of data from the EDW 514 and/or the source systems 512. Further, ingestion framework 522 may setup modules for collecting data from structured and unstructured file sources (e.g., hosted on network attached storage (NAS) arrays), internal file shares, and File Transfer Protocols (FTPs).

In some embodiments, ingestion framework 522 may manage or control different APIs for the reception of data. In such embodiments, ingestion framework 522 may connect directly to source systems 512 through APIs or gather data for processing (e.g., by passing EDW 514). In such embodiments, ingestion framework 522 may manage data APIs (e.g., for business operations), Software as a service (SaaS) APIs (e.g., to ingest SaaS applications data into data warehouses or data lakes), and partner APIs (e.g., third-party APIs).

In some embodiments, ingestion framework 522 may also run import jobs that can interact with APIs for the collection and processing of data from EDW 514 and/or source systems 512. The ingestion/import jobs may configure ingestion framework 522 to process data in batches and/or streams. In such embodiments, ingestion framework 522 may carry out data ingestion in two different phases: batch and stream processing (real-time). Batch processing may apply to a block of data that is already in storage for some time. For example, certain source systems 512 may batch process all the transactions performed in a 6-12-24 hour window. On the other hand, source systems 512 may process data in real-time and detect conditions within a short period from receiving the data in stream processing.

Data integration 524 may be connected to ingestion framework 522 and include a query manager, a scripting module, and/or integration tables. Data integration 524 may include a query model that handles queries from other services requesting information on data that has been processed through ingestion framework 522. The query manager may schedule and execute queries to read, write, delete, or create object tables in a data warehouse. The scripting module may be configured to transform ingested data to integration and/or consolidation tables. For example, as further discussed in connection with FIG. 11, scripting module may execute operations to transform data processed by ingestion framework 522 into integration and/or consolidation tables with keys and attributes that can be common to different data types and data formats. The integration and/or consolidation tables in data integration 524 may be stored in a single location to facilitate access by downstream users. In some embodiments, the single location may be a physical single location (e.g., a single server). In other embodiments, however, the single storage location may be virtual and be composed of one or more virtualized memory instances.

As further discussed in connection with FIGS. 8 and 9, the integration or consolidation tables may have a key and a series of attributes. Further the integration of consolidation tables may be associated with each other as part of general groups (e.g., a "monthly extracts" group) or through individual associations.

As shown in FIG. 5, third stage 530 may include a publication module 532, a local modeling module 534, and a downstream modeling module 536. Publication module 532 may publish data that is stored in second stage 520 (e.g., stored in the ingestion framework 522 and/or data integration 524). In some embodiments, publication module 532 may publish data by making it accessible to users through APIs, open directories, and/or other file transfer mechanisms. Additionally, or alternatively, publication module 532 may publish data through default models. For example, publication module 532 may publish data in a lifecycle model and/or in reference data for CRM.

Local modeling module 534 may include a modeling engine to train and test models. Local modeling module 534 may use tables in data integration 524 for training of feature identification and/or to provide specific data analysis. In some embodiments, features may be extracted from a dataset by applying a pre-trained convolutional neural network.

Additionally, local modeling module 534 may include tools for evaluating and/or monitoring model accuracy. For example, local modeling module 534 may associate training datasets with resulting modules. In such embodiments, local modeling module 534 may update models when their underlying data is modified. In such embodiments, local modeling module 534 may re-train modules using modified data and signal the availability of the new module to downstream users.

Downstream modeling module 536 may communicate with users (e.g., data consumer 108*a* to 108*n*) and execute models provided by downstream users and/or monitor their performance. For example, using data published by publication module 532, downstream users may train or generate different data models. Downstream modeling module 536 may receive these models and manage their performance, generate updates (e.g., when training date is modified), and/or implement them by providing a server that interfaces directly with users to provide modeled data.

Figure 6:
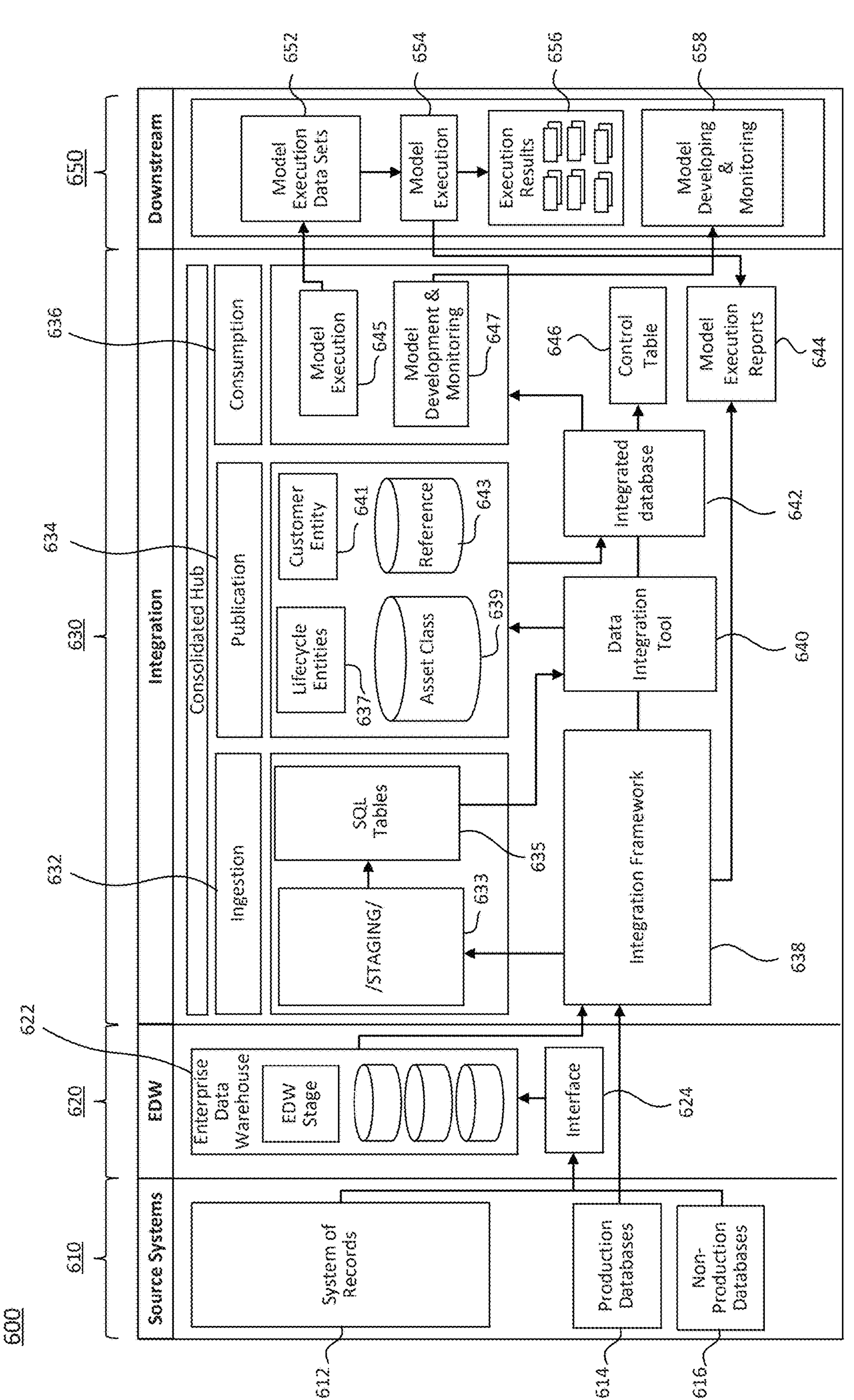
FIG. 6 is a first exemplary system architecture for a consolidated data hub, consistent with disclosed embodiments.

FIG. 6 is a first exemplary system architecture 600 for a consolidated data hub, consistent with disclosed embodiments. In some embodiments, system 100 (FIG. 1) may implement the functions and processes described in block diagram 600. For example, stages in FIG. 6 may be implemented by one or more of data sources 102A-102M, enterprise data warehouse 104, data hub 206, and data consumers 108A-108N. The description below of architecture 600 describes embodiments in which system 100 implement operations. However, similar descriptions apply for other system implementations.

System architecture 600 may include a source system stage 610, an EDW stage 620, an integration stage 630, and a downstream stage 650. In some embodiments, the different stages may be analogous to the blocks in block diagram 500. For example, source system stage 610 may be analogous to source systems 512, EDW stage 620 may be analogous to EDW 514, integration stage 630 may be analogous to combined ingestion framework 522 and data integration 524, and downstream stage 650 may be analogous to third stage 530 (including publication module 532, local modeling module 534, and downstream modeling module 536).

As shown in FIG. 6, and further discussed in connection with respect to FIG. 5, source system stage 610 may involve the collection of data from different sources including, but not limited to, a system of records 612, production databases 614, and non-production databases 616. System of records 612 may include structured and unstructured file sources (e.g., hosted on network attached storage (NAS) arrays), internal file shares, and FTPs. Production databases 614 may include production or "live" databases used in active tasks and maybe dynamic, creating, updating, and/or deleting records. Non-production databases 616 may include non-operational environments that include relevant data but do not process live data and do not run any operations and has not been deployed to permit any users to access live data.

As shown in FIG. 6, EDW stage 620 may include an EDW 622 and an interface 624. As discussed in connection with FIG. 5, EDW 622 may include an EDW stage for processing data from source systems, including a data staging server software and a data store archive (repository) of the outcomes of the extraction, transformation, and loading activities in the data warehousing process. EDW 622 may include independent data storage units that may be arranged for storing specific information collected from source system stage 610.

EDW interface 624 may include file transfer and/or API controllers that allow EDW 622 to communicate with elements in source systems stage 610. In some embodiments, EDW interface 624 may include an interfacing layer that implementing extract, transform, load (ETL) and extract, load, transform (ELT) tools connecting to source data and perform its extraction, transformation, and loading into the EDW 622 storage. In such embodiments, the distinction between ETL and ELT approaches may be based on the order of events. For example, in ETL the transformation may happen in a staging area before the data gets into an EDW.

As shown in FIG. 6, interface 624 may connect with system of records 612, production databases 614, and non-production databases 616. In other embodiments, as further discussed in connection with FIG. 5, the connection between EDW 622 and the source systems may be individual or based on specific applications.

Integration stage 630 may include an ingestion layer 632, a publication layer 634, and a consumption layer 636. These three layers may form act in parallel and form the consolidated data hub for facilitating centralization and normalization of data sources that can be provisioned to downstream users.

Ingestion layer 632 may include staging area 633. As discussed in connection with FIG. 5, staging area 633 may include memory locations and/or processing resources for interim storage and processing for data being processed from (for example) source system stage 610. As shown in FIG. 6, in some embodiments staging area 633 may be located in between the data sources (such as system of records 612) and data targets (such as SQL Tables 635). In some embodiments, staging area 633 may be ephemeral in nature, with their contents being wiped before performing an ETL process or shortly after it has been completed successfully. In other embodiments, however, staging area 633 may be designed to hold data for long periods of time for preservation or debugging purposes.

Ingestion layer 632 may also include SQL tables 635, which may be configured to hold data for indexed object tables. In such embodiments, the tables in SQL tables 635 may be in data structures comprising an indexing key associated with attributes. Tables in SQL tables 635 may standardize the information imported from data sources that is stored and transformed to generate uniform data sources that can be more easily accessed, searched, and utilized for later modeling or analytics stages (such as in consumption layer 636). For example, as discussed in connection with FIGS. 8 and 9, the tables in SQL tables 635 may utilize object structures in which an indexing key is associated with attributes. Object tables may be related with each other, categorized, or generated for specific modeling requests. In some embodiments, SQL tables 635 may be organized as objects holding data in one or more relational databases. In some embodiments, SQL tables 635 may be generated through scripts and/or programing interfaces that capture data in staging area 633 and transform data to tables.

While FIG. 6 shows tables as SQL tables 635, in some embodiments the tables may not be limited to SQL data arrangements and be stored as NoSQL structures. For example, tables in ingestion layer 632 may be organized with NoSQL data management such as key-value storages, document store, wide-column store, graph store, and/or in-memory stores.

In some embodiments, object tables in SQL tables 635 may include different types of tables that include different attributes and indexing keys. As further discussed in connection with FIGS. 8 and 9, object tables may include an indexing key and attributes. In such embodiments, object tables may include different types of objects including, for example, profiling tables, integration tables, consolidation tables, and/or conformity tables. Each of the tables may have a specific type of attribute or association. In some embodiments, profiling tables may be configured to store asset class attributes. The integration or consolidation tables may be configured to store attributes of integrated of aggregated or processed data with attributes. As further discussed in connection with FIGS. 8 and 9 may have tables that integrate or consolidate data based on aggregation, third party data, arrangements, or attribute categories. Further, conformity tables may be generated to store data type attributes (e.g., periodic data vs. single instance data). Table objects in SQL tables 635, however, need not be single purpose, and in some embodiments, integration tables may include consolidation, profiling, and/or conformity information.

As shown as in FIG. 6, integration stage 630 may also include integration framework 638. Integration framework 638 may include memory spaces and/or processing instances that may organize data received from source system stage 610 and/or EDW 622. Integration framework 638 may perform data transformations to permit data analysis regardless of the source system or data format. Integration framework 638 may generate logs or transformed datasets to unify data management and enable integrations. In some embodiments, integration framework 638 may be a conduit for an API to access servers of data integration. In certain embodiments, integration framework 638 may perform operations for anonymizing or masking data for integration in datasets. Integration framework 638 may be in communication with source system stage 610, EDW 620, data integration tools 640, ingestion layer 632, and consumption layer 636.

Data integration tools 640 may include memory spaces and/or processing instances to ingest, consolidate, transform, and transfer data from its originating source to a destination, performing mappings, and data cleansing. Data integration tools 640 may include data catalogs, data cleansing, data connectors, and data digestor. Additionally, or alternatively, data integration tools 640 may include tools for data governance for the availability, security, usability, and integrity of data. Further, data integration tools 640 may include data migration, ETL tools, and master data management. In some embodiments, data integration tools 640 may include tools such as Apache Kafka, Hevo Data, Apache NiFi, and/or Airbyte, among others.

As shown in FIG. 6, data integration tools 640 may connect integration framework 638 with other elements in integration stage 630. For example, data integration tools 640 may connect integration framework 638 with an integrated database 642. In some embodiments, integrated database 642 may store tables of data as discussed in connection with SQL tables 635. Integrated database 642 may include data structure storing data that has been processed through integration framework 638 and data integration tools 640 to establish databases with datasets that are more easily accessible and digested for modeling training.

Data integration tools 640 may also communicate with publication layer 634. Publication layer 634 may expose certain data for users to interact with the data stored in tables, integrated databases, and/or consolidated storage. Publication layer 634 may host tools to respond to user queries and/or to generate responsive data for different types of requests. In some embodiments, publication layer 634 may generate graphical user interfaces for graphical representation of data. For example, as discussed in connection with FIG. 10, publication layer 634 may provide instructions for the generation of dashboards in user devices.

As shown in FIG. 6, publication layer 634 may include different processing and data storage modules. For example, publication layer 634 may include a lifecycle entities 637 that may store and/or expose data collecting from ingestion layer and/or data integration tools 640 organized based in lifecycles. Lifecycle entities 637 may expose information about life cycle equipment management to facilitate analysis of information according to phases of the equipment's life cycle (e.g., beginning with planning for equipment acquisition and ending in disposal of equipment). Such modules may facilitate communication, provide a contained and pre-organized set of information, to facilitate data modeling and assessment. For example, the life cycle/obsolescence plan for equipment and related processes can be clearly communicated to impacted users more readily to facilitate operations, manufacturing, sales, marketing, inventory management, and finance among others. Similarly, publication layer 634 may include a costumer cycle entity 641 that may compile and organize data to facilitate modeling and/or analysis of customer interaction data (e.g., data used in CRM).

Publication layer 634 may also include reference data 643 and asset class data 639, which may store information that may be used for the correction of certain of the compiled data. For example, as further discussed in connection to FIGS. 4 and 11, compiled data may be curated using a conformity job that helps identify anomalies or outlier information that is outside of expected values and certain data rules may be applied to modify or eliminate outlier data from the information used for data modeling. In such embodiments, the reference data 643 and asset class data 639 may be used for determination of outlier information and/or in normalization processes before publishing.

While in some embodiment the conformity job may be executed during publishing stages (e.g., using reference data 643 to identify inconsistencies), in some embodiments conformity jobs may be generated by comparing data in integrated database 642 against a control tables 646. For example, control tables 646 may be used for executing a conformity job that compares tables to identify data completeness (e.g., missing records), identify null attributes, identify outlier data (e.g., data outside a range in control tables 646), identify data truncations, and improper dimensions. In some embodiments, the conformity job may include scripts that apply rules based on control tables 646, reference data 643, and asset class data 639 to modify, delete, or recharacterize data.

Consumption layer 636 may additionally include a model execution 645, model development & monitoring 647, and model execution reports 644. Model execution 645 may include storage or processing units for executing models and/or object models that may be derived from collected information. For example, model execution 645 may contain definitions of the field types in the data model. Model execution 645 may include data model tables corresponding to different entries. In some embodiments, model execution 645 may be performed through virtual machines (VMs) that support the specification and process management and for implementing models.

Model development and monitoring 647 may include one or more computing systems configured to generate analytics models. Model development and monitoring 647 may receive or obtain data from integrated database 642, publication layer 634, integration framework 638, and/or other components in system architecture 600. Model development and monitoring 647 may label the collected with metadata that identify characteristics, further described in connection with FIGS. 8 and 9, and then use labeled data for directed training of models.

Additionally, model development and monitoring 647 may be configured to identify and retrain models the underlying data that has changed. For example, model development and monitoring 647 may determine that data in integrated database 642 has changed and trigger procedures to retrain or adjust models.

In some embodiments, model development and monitoring 647 may receive requests from downstream users. As a response to the request, model development and monitoring 647 may generate one or more classification or identification models. Classification models may include statistical algorithms that are used to determine predictive analytics based on training datasets. For example, classification models may be convolutional neural networks (CNNs) that determine attributes in a dataset based on extracted parameters. Identification models may also include regression models that estimate the relationships among input and output variables. Identification or classification models may additionally sort elements of a dataset using one or more classifiers to determine the probability of a specific outcome. Identification or classification models may be parametric, non-parametric, and/or semi-parametric models.

Model execution reports 644, may include one or more computing systems configured to generate reports of model executions. Model execution reports 644 may include software modeling checking and report generation to provide downstream users reports of models ran in integration stage 630. Model execution reports 644 may include microservices for SQL statements and modeling reports.

Downstream stage 650 may represent connections to downstream users that may access and use the data collected in other stages for training or deploying models. As shown in FIG. 6, downstream stage 650 may include parallel modules compared with those of consumption layer 636. For example, downstream stage 650 may include model developing & monitoring 658 (analogous to model development & monitoring 647), model execution 654 (analogous to model execution 645), and execution results 656 (analogous to model execution reports 644). Additionally, downstream stage 650 may include a model execution dataset storage 652 that may collect training or modeled data used by downstream users in the generation of models from the consolidated data hub.

Figure 7:
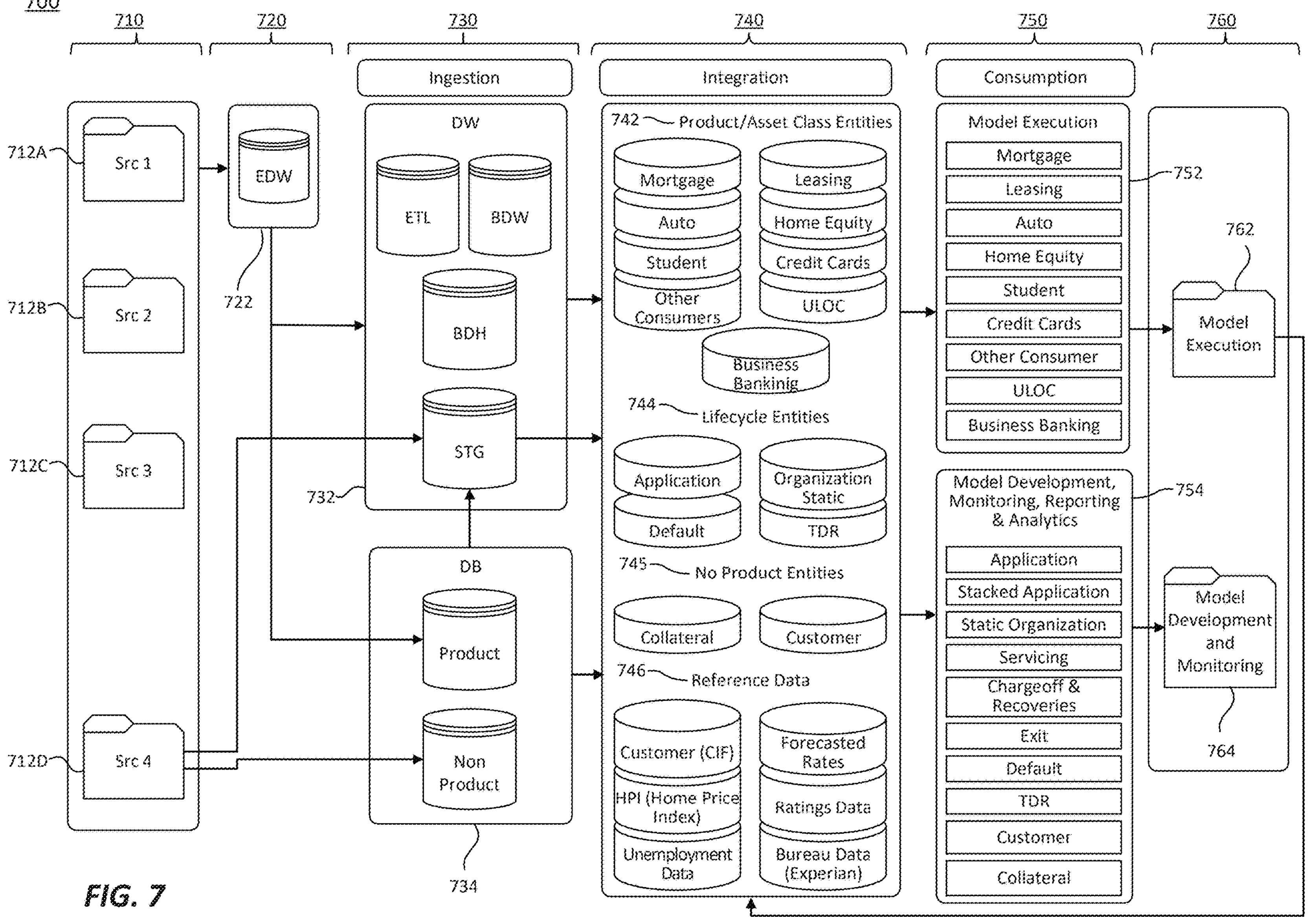
FIG. 7 is a second exemplary system architecture for a consolidated data hub, consistent with disclosed embodiments.

FIG. 7 is a second exemplary system architecture 700 for a consolidated data hub, consistent with disclosed embodiments. In some embodiments, system 100 (FIG. 1) may implement the functions and processes described in block diagram 500. For example, stages in FIG. 7 may be implemented by one or more of data sources 102A-102M, enterprise data warehouse 104, data hub 206, and data consumers 108A-108N. The description below of architecture 700 describes embodiments in which system 100 implement operations. However, similar descriptions apply for other system implementations.

As shown in FIG. 7, architecture 700 may include similar stages as the ones described for architecture 600 (FIG. 6), also including source system stage 710, an EDW stage 720, and a downstream stage 760. But unlike architecture 600, which groups ingestion, publication, and consumption stages as part of single integration stage 630 in a consolidated hub, the architecture 700 has independent stages for ingestion stage 730, integration stage 740, and consumption stage 750. In some embodiments, the different stages may be implemented in independent memory and processing units. For example, each of ingestion stage 730, integration stage 740, and consumption stage 750 may be implemented distinct servers. In other embodiments, however, stages may be implemented as VMs or microservices in logical partitions.

Source system stage 710, similar to source system stage 610, may include different sources and systems of records that store data. As shown in FIG. 7, source system stage 710 may include different data sources 712A to 712D. As discussed in connection with FIG. 6, the data sources 712 may be folders, relational databases, non-relational databases, production databases, and/or non-production databases.

EDW stage 720, similar to EDW stage 620, may include interfaces, storage, staging, and processing for implementing an enterprise data warehouse storing information received from source system stage 710.

Ingestion stage 730 may include a data warehouse (DW) 732 and data base (DB) 734. DW 732 may be configured to handle transformation and conformity job tasks to transform data in EDW stage 720 in data for the consolidated data hub. In some embodiments, DW 732 may include a staging area (STG). As further discussed in connection with FIG. 6, the staging area may be used to hold data during processing and/or for additional purposes during processing of incoming data. DW 732 may also include an extraction transformation load (ETL) module for the processing of incoming data. Additionally, or alternatively, DW 732 may include or implement banking data warehouse (BDW) software to process or generate data marts with a plurality of components for support and development required to report data warehousing and analytics in banking environments such as Customer Profitability, Wallet Share Analysis, Customer Attrition Analysis, Liquidity Analysis, and so forth. DW 732 may also include or implement big data handling (BDH) software. BDH may include both open source and commercial software that can be deployed, often in combination with one another, includes distributed processing frameworks Hadoop and Spark; stream processing engines; cloud object storage services; cluster management software; NoSQL databases; data lake and data warehouse platforms; and SQL query engines. BDH may be employed to enable easier scalability and more flexibility on deployments during data transformation.

DB 734 may include both production and non-production memory spaces that can be used to store ingested data. For example, as further discussed in connection with FIG. 6, databases in consolidated data hubs may include both production and non-production databases that implement integration frameworks and/or consolidated information in an integrated database.

Integration stage 740 may include databases with specific data structures that are organized according to requests from downstream consumers to facilitate data consolidation for specific modeling. In some embodiments, integration stage 740 may be analogous to the publication layer 634 and organize data in different processing units and databases (also known as entities) for faster or easier access during data modeling for specific tasks or request by downstream users. Integration stage 740 may include product/asset class entities 742 that store data structures consolidating data for product or assets such as mortgage, leasing, auto, home equity, student loan, home equity, credit cards, business banking, unsecured line of credit (ULOC), or other assets. Additionally, integration stage 740 may include lifecycle entities 744 that store data structures consolidating data for products based on a lifecycle such as application, static organization, default, and/or transactional data reporting (TDR). Integration stage 740 may also include no product entities 745 that store structures consolidating data for assets that are not products, such as collateral or simply consumer data. Further, integration stage 740 may include reference data 746. As discussed in connection with FIG. 6, reference data may be employed during the execution of conformity jobs to identify outliers and make corrections based on ranges. The reference data may include customer information file (CIF), forecasted rates, Home price index (HPI), ratings data, unemployment data, and Bureau Data.

Consumption stage 750 may include a model execution module 752 and model development, monitoring, reporting & analytics module 754. Model execution module 752 may be analogous to model execution 645, and be configurable to develop models based on the integrated data. For example, model execution module 752 may execute models according to integration or consolidation tables generated for integration tables 740. Model execution module 752 may execute models for mortgage, leasing, auto, home equity, student loan, other asset, ULOC, and business banking. Model development, monitoring, reporting & analytics module 754 may be analogous to model development & monitoring 647, and be configurable to train, develop, and monitoring underlying data used for models. For example, model development, monitoring, reporting & analytics module 754 may track dynamic data in integration stage 740 and update models based on data changes. The model development, monitoring, reporting & analytics module 754 may monitor specific types of data relevant for downstream users such as application, stacked application, static organization, serving, charge off and recoveries, default TD, credit exiting, and changes in credit.

Downstream stage 760 may be analogous to downstream stage 650 and include a model execute module 762 and a model development and monitoring module 764. These may perform similar functions as the model execution 654 and model developing & monitoring 658.

FIG. 8A is a first part of a first exemplary object arrangement 800 of integration and/or consolidation tables in a consolidated data hub, consistent with disclosed embodiments. Tables in object arrangement 800 may be stored in a consolidated data hub. For example, tables may be stored in SQL tables 635, as part of publication layer 634, and or in integrated database 642. Additionally, or alternatively, tables may be stored as part of entities in integration stage 740.

Table 802 shows the different portions of the object and the corresponding data structure. As shown in FIG. 8A, table 802 may include an indexing key 802A and attributes 802B. Indexing key 802A may specify a table or view name that indicates the type of data that has been integrated or consolidated in the table. Attributes 802B may specify information relevant to the key. For example, as part of the table object, attributes 802B may specify fields and/or partitions.

Object arrangement 800 shows exemplary tables that may be created as object data structures describing exemplary indexing keys and attributes. Table 806 is an exemplary table for an application indexing key, which may be relevant to lifecycles applications (as discussed in connection with FIGS. 6 and 7). Similarly, table 808 and table 848 are exemplary tables for application indexing key for origination and fixed rate partition respectively, describing data structures that may be generated in response to downstream requests for modeling lifecycles.

As shown in FIG. 8A, certain tables may be associated in general categories. For example, a reference category 810 may categorize table 812 for charge off recovery, table 814 for FAS account, and table 816 collateral. These tables may be associated as reference tables. The categorization may facilitate association of table objects for specific modeling requests. For example, reference category 810 may be used during conformity jobs to modify or edit attributes in other tables. Similarly, a product category table 833 may group or categorize table 831 for revolving data, table 833 for mortgage data, table 835 for installment data, table 837 for commercial loan data, and table 839 for lease data.

Additionally, or alternatively, the database storing tables may include associations between different indexing keys. In such embodiments, certain tables may feed attributes or information to other tables. As shown in FIG. 8A tables may communicate attributes for data consolidation. For example, table 812, table 814, and table 816 may be associated with table 842 for key in arrangement, which may consolidate data from reference category 810 and product category 830. Integration or consolidation tables such as table 842 may include modified or edited data after employing a conformity job to remove or modify outliers and/or inconsistent data.

Figure 8B:
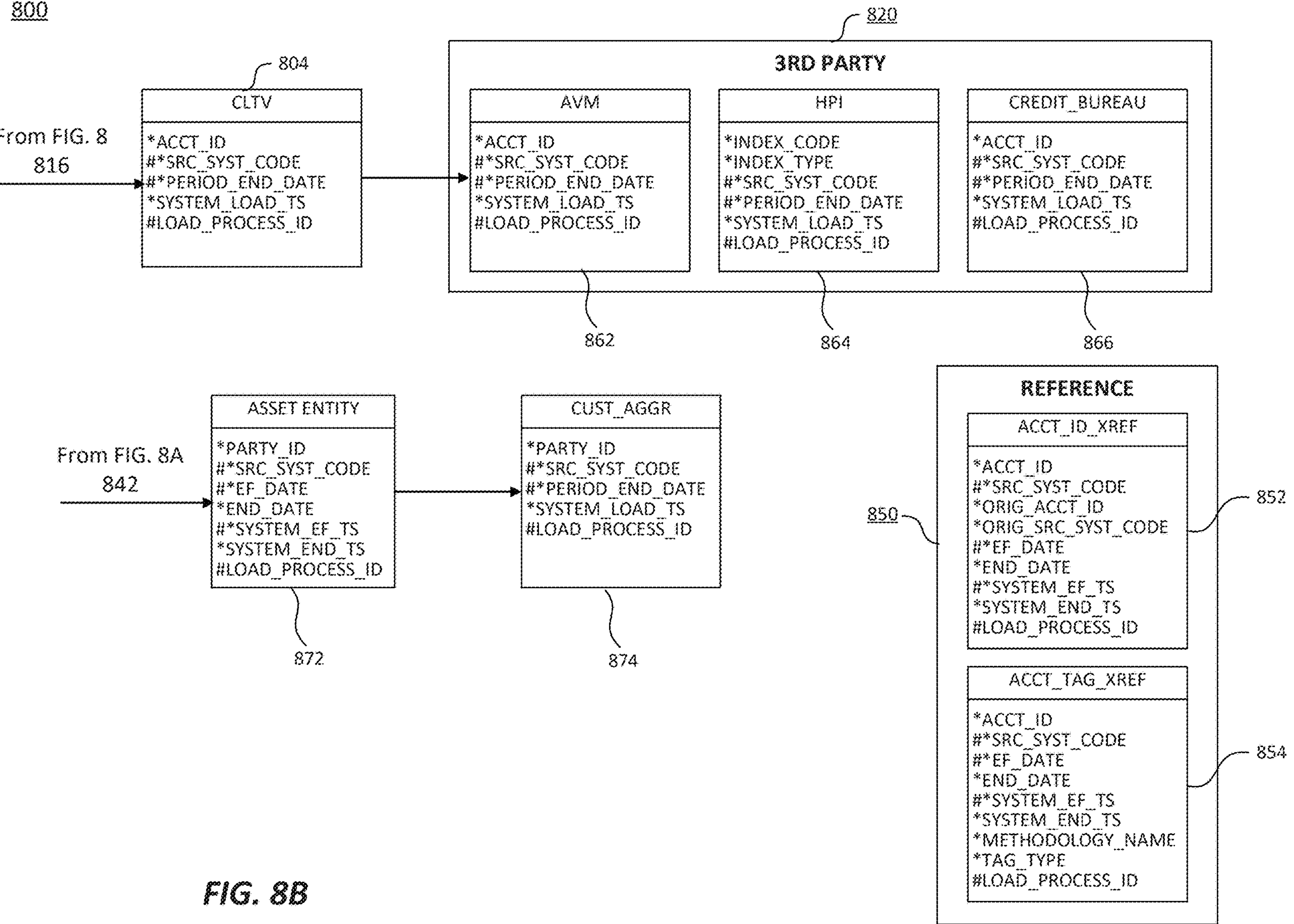
FIG. 8B is a second part of the first exemplary object arrangement of integration and/or consolidation tables and relations, consistent with disclosed embodiments.

FIG. 8B is a second part of the first exemplary object arrangement 800 of integration and/or consolidation tables, consistent with disclosed embodiments. FIG. 8B shows additional integration or consolidation tables that further describe the data consolidation that may be generated through data consolidation. As shown in FIG. 8B, tables may feed data between each other for the generation of data structures that are employable for data modeling. For example, table 804 for combined loan to value (CLTV) data, which may be coupled with table 816. In turn, table 804 may be connected or feed information to tables in a third-party category 820, which may include table 862 for automated valuation model (AVM), table 864 for House Price Index (HPI) data, and table 866 for bureau data.

Additional tables of object may include table 872, which may communicate with table 842 to store attributes related to a specific asset entity. Further table 874 may store attributes associated with customer aggregated data. In some embodiments, the costumer aggregated data may be tokenized or anonymized to include it as part of training or testing datasets for modeling. In some embodiments, table 874 may store as attributes data of customers that has been tokenized by a process of substituting a sensitive data element with a non-sensitive equivalent, referred to as a token, which has no intrinsic or exploitable meaning or value. Tokenized data may include identifies that map back to the sensitive data through a tokenization system (e.g., integration framework 638 and/or data integration tools 640). In some embodiments, the tokenization may involve a one-way cryptographic function used to convert the original data into tokens. Application of tokenization to data stored in table objects, like the ones shown in object arrangement 800 may protect consumer information, comply with data privacy policies, and improve processes to offer database integrity and physical security.

As shown in FIG. 8B, additional reference categories may be part of object arrangement 800. For example, cross reference category 850 may include tables that include data used for identification of outlier data. Table 852 may include attributes storing data related to identification cross references. Table 854 may include attributes associated with tagging cross references. Table 852 and table 854 may facilitate identification of attributes that need to be modified or corrected during data transformations and/or before modeling tasks.

Figure 9A:
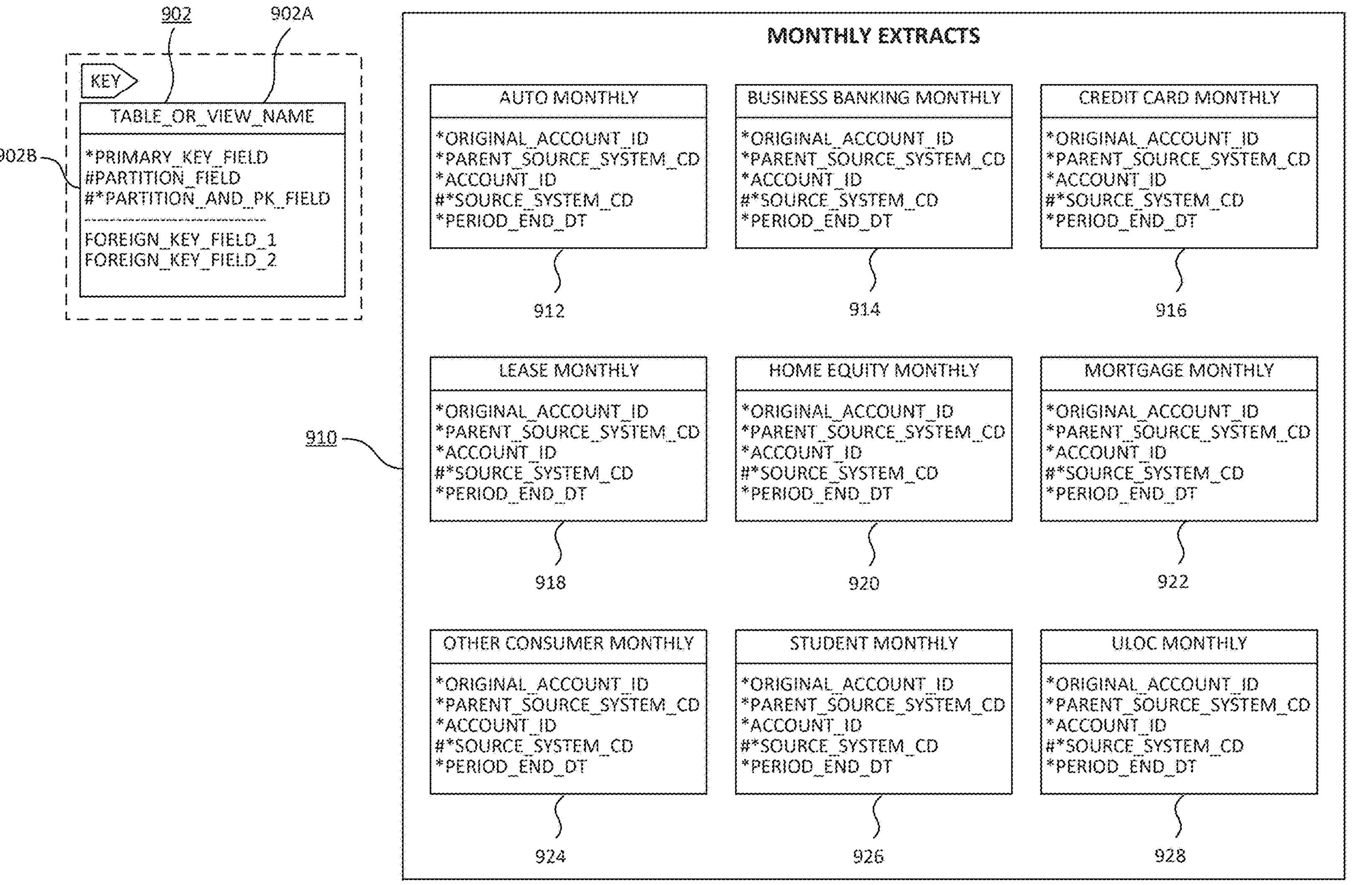
FIG. 9A is a first part of a second exemplary object arrangement of integration and/or consolidation tables and relations in a consolidated data hub, consistent with disclosed embodiments.

FIG. 9A is a first part of a second exemplary object arrangement 900 of integration and/or consolidation tables in a consolidated data hub, consistent with disclosed embodiments. Tables in object arrangement 900 may be stored in a consolidated data hub. For example, tables may be stored in SQL tables 635, as part of publication layer 634, and or in integrated database 642. Additionally, or alternatively, tables may be stored as part of entities in integration stage 740.

Table 902 shows the different portions of the object and the corresponding data structure. Similar to table 802 (FIG. 8A), table 802 may include an indexing key 902A and attributes 902B.

Similar to object arrangement 800, object arrangement 900 may include a plurality of table objects organized to facilitate modeling and/or data analysis. But unlike object arrangement 800, object arrangement 900 may include alternative structures that facilitate specific tasks, describing table objects generated in response to downstream requests. For example, as shown in FIG. 9A tables in object arrangement 900 may be generally categorized in a global category 910. The example shown in FIG. 9A is for a monthly extract category that categorizes table objects organized for monthly extract modeling. The tables in the global category 910 may include table 912 for auto loan data, table 914 for business banking data, table 916 for credit card data, and table 918 for lease data.

Global category 910 may also include table objects with indexing and attributes directed to home equity data (table 920), mortgage data (table 922), and consumer data (table 924). Additionally, or alternatively, global category 910 may also include student credit data (table 926) and ULOC data (table 928).

Figure 9B:
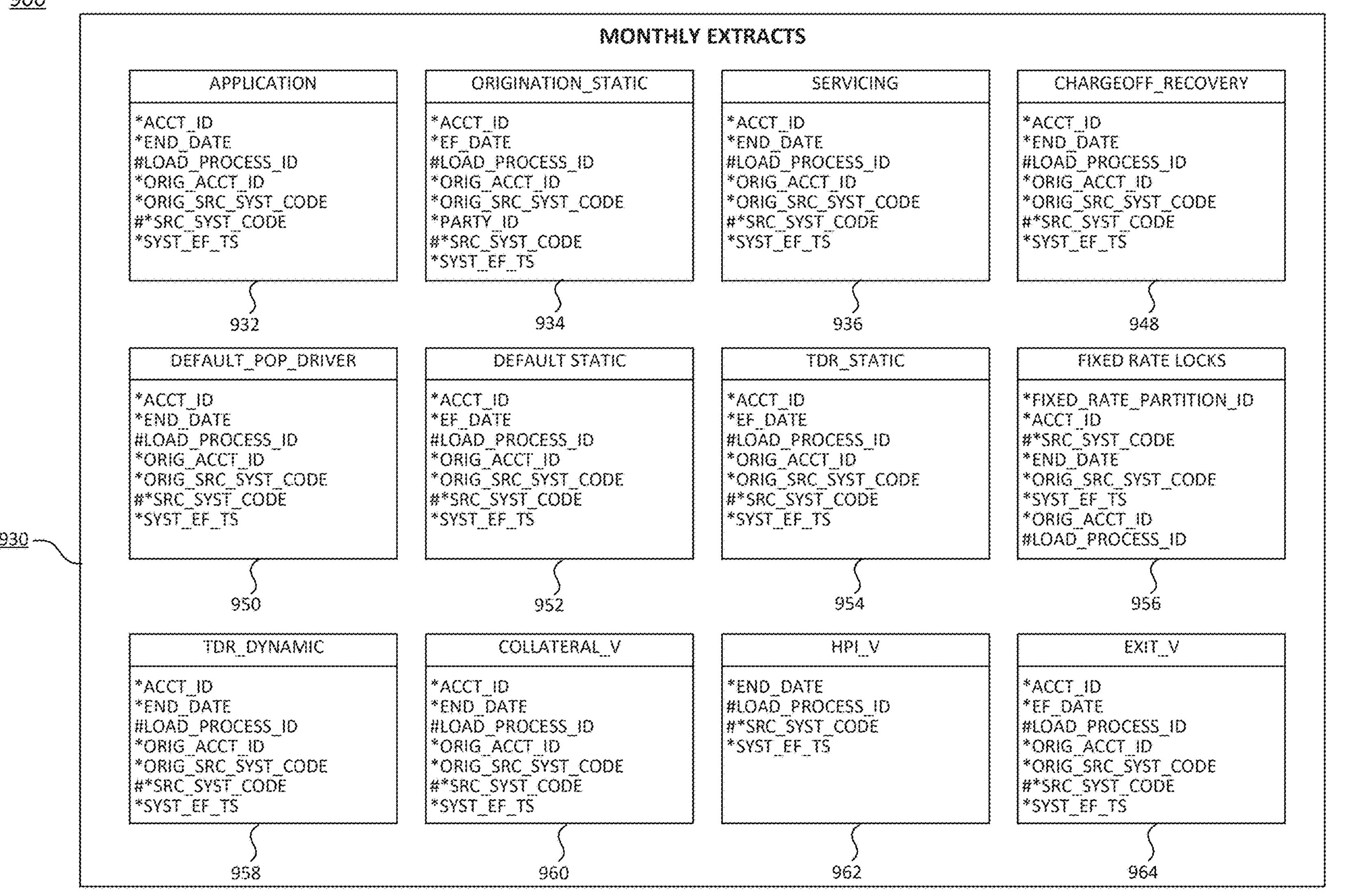
FIG. 9B is a second part of the second exemplary object arrangement of integration and/or consolidation tables and relations, consistent with disclosed embodiments.

FIG. 9B is a second part of the second exemplary object arrangement 900 representing integration and/or consolidation tables, consistent with disclosed embodiments. FIG. 9B shows additional integration or consolidation tables that further describe the data consolidation that may be generated through data consolidation. As shown in FIG. 9B, tables in object arrangement 900 may also be categorized in a global category 930. Following embodiment in FIG. 9A, the example in FIG. 9B may have table object organized to facilitate monthly extract modeling. The tables in global category 930 may include tables with indexing keys and attributes directed to Application data (table 932), static origination data (table 934), servicing data (936), and charge off or recovery data (table 948). Additionally, or alternatively, global category 930 may include table objects for credit default parameters such as objects with indexes and attributes for dynamic default data (table 950) and static default data (table 952).

Additionally, or alternatively, global category 930 may include table object with indexes and attributes for static troubled debt restructuring (TDR, table 954) fixed rate locks (table 956), dynamic troubled debt restructuring (TDR, table 958), collateral data (table 960), HPI data (table 962), and exit credit (table 964).

Figure 10:
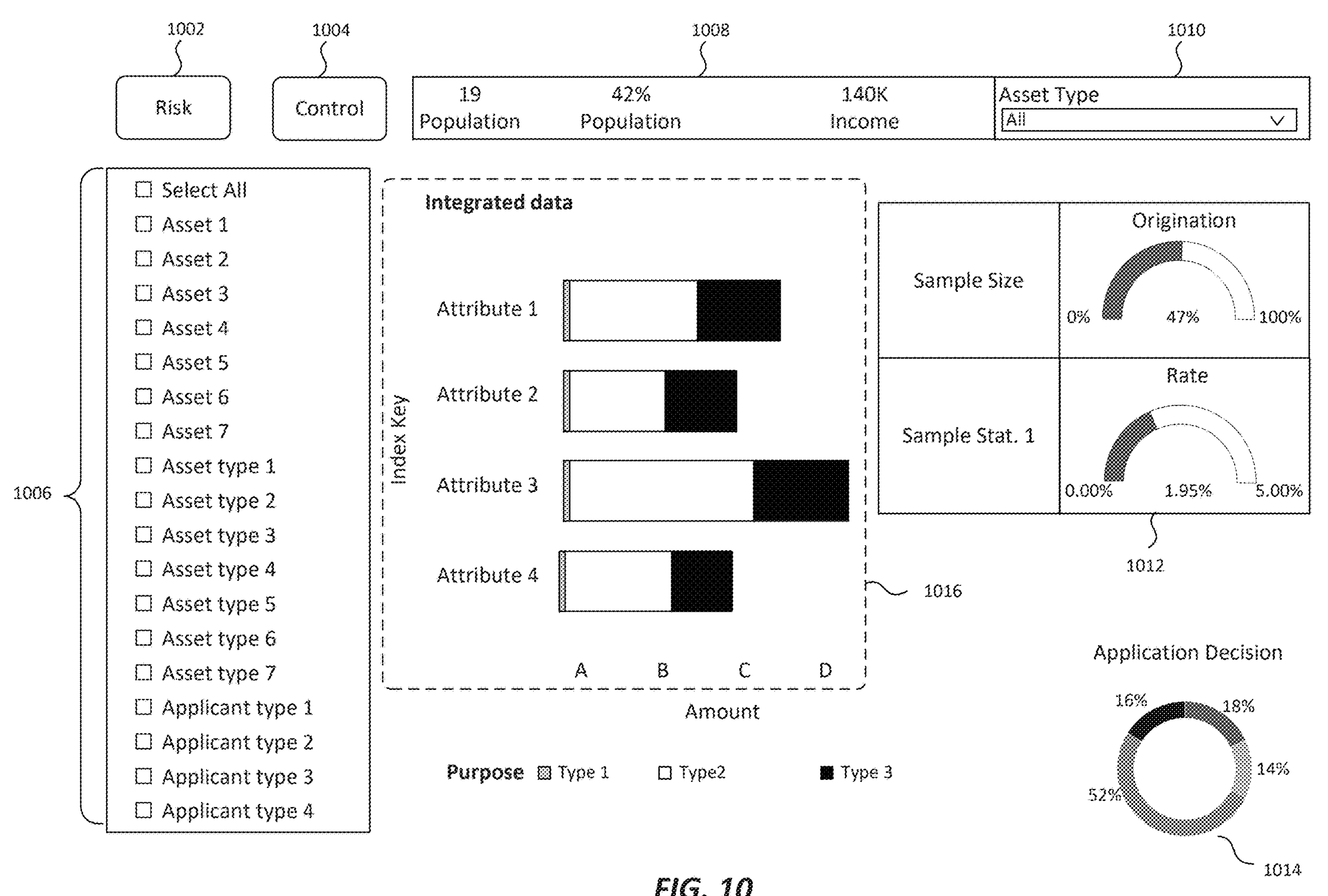
FIG. 10 is an exemplary dashboard interface for displaying data in a consolidated data hub, consistent with disclosed embodiments.

FIG. 10 is an exemplary dashboard 1000 for displaying data in a consolidated data hub, consistent with disclosed embodiments. In some embodiments, dashboard 1000 may be generated by data hub 106. For example, dashboard 1000 may be generated by publication module 532, publication table 648, and/or integration stage 740. In such embodiments, data hub 106 may publish dashboard 1000 and/or generate instructions for displaying dashboard 1000 in user graphical user interfaces.

Dashboard 1000 may include buttons for different modes. For example, dashboard 1000 may include a risk button 1002 that would trigger displays or report results from risk modules in the dashboard (e.g., altering the display to show risk-relevant factors). Risk modules may encompass models or data analytics for Governance, Risk and Compliance (GRC) Management, and/or for risks across multiple assets, asset types, or customers. Dashboard 1000 may also include a control button 1004 that would trigger displays or report results from control modules in the dashboard (e.g., altering the display to show control-relevant factors). The control module may include tools for planning asset finances, management expenditures, and organizational planning. Control module may also include tools for financial accounting module and live streaming of certain data (e.g., data being captured through APIs). Control module tools may include element accounting, cost center accounting, activity-based accounting, product cost controlling, and profitability analysis.

Dashboard 1000 may also include asset selection 1006 to allow users specify assets to narrow-down modeling reports. While FIG. 10 shows asset selection 1006 as a checkbox list, other selection mechanisms may be possible. For example, dashboard 1000 may specify radio buttons, drop-lists, or menus, which get populated based on assets and/or asset types available in the integration data.

Dashboard 1000 may additionally include a banner 1008. In some embodiments, banner 1008 may specify general statistics of assets, types, or products based on user selections (e.g., in asset selection 1006). Further, dashboard 1000 may include an asset drop-list 1010 that may be configured to be populated with asset types or entities available in the consolidated data hub and allow user to select specific categories (such as category 910) to facilitate displays.

Dashboard 1000 may also include different visualizations that help convey data modeling or analyses reports from the consolidated data hub. As discussed in connection with FIGS. 6 and 7, disclosed systems may include model execution and development modules. Dashboard 1000 may use graphical tools for presentation of execution results or model development. For example, as shown in FIG. 10, dashboard 1000 may include a table representation 1016 that illustrates attributes in consolidation or integration tables based on indexing key. Further, dashboard 1000 may include statistical representations 1012 illustrating analyses of consolidated data in a data hub. Additionally, or alternatively, dashboard 1000 may include graphic tool 1014 to provide statistical information about a specific table object. As an example, as shown in FIG. 10, graphic tool 1014 may represent attributes in table 806.

Figure 11:
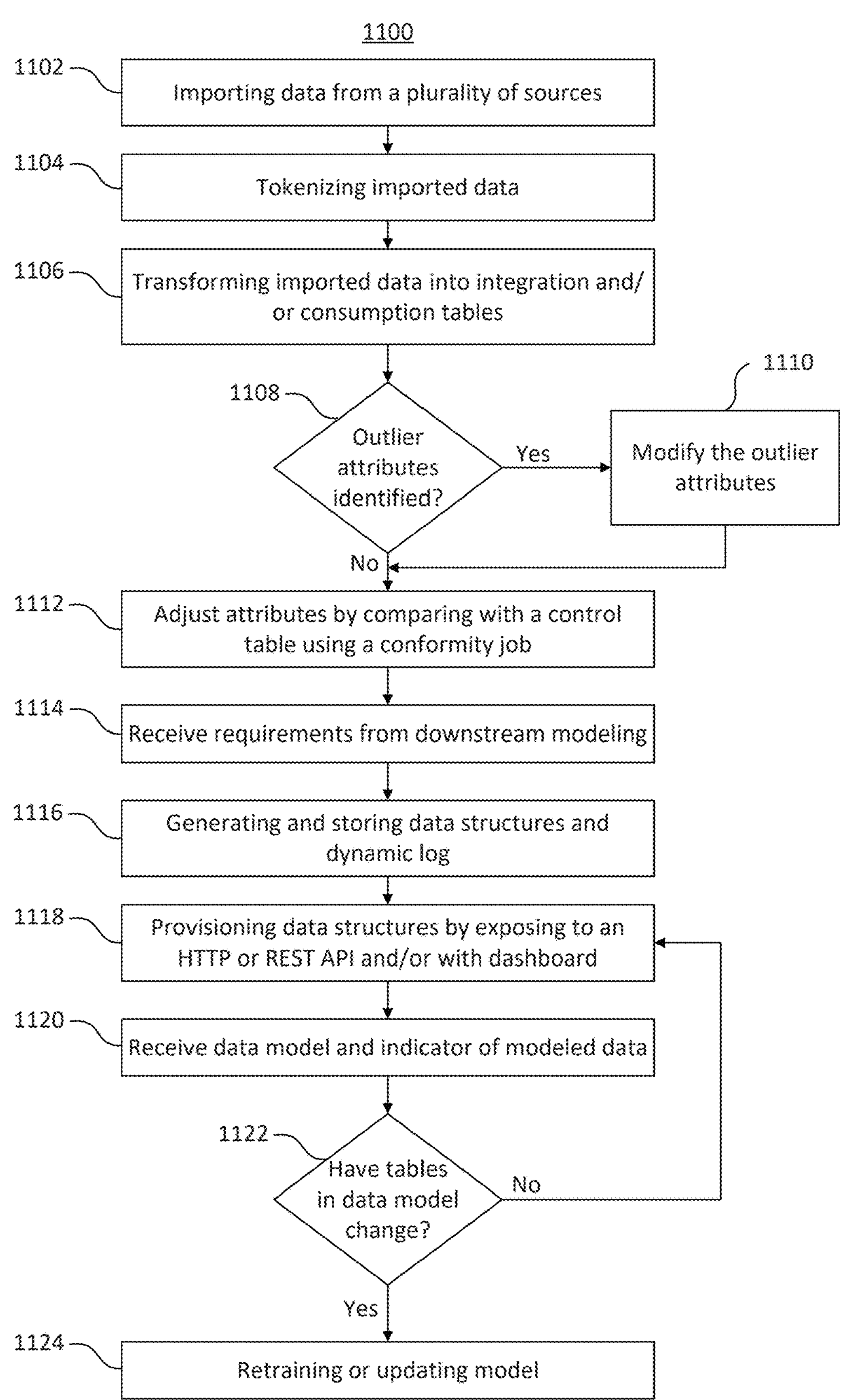
FIG. 11 is an exemplary flowchart for the generation and maintenance of a consolidated data hub, consistent with disclosed embodiments.

FIG. 11 is a flowchart of an exemplary process 1100 for the generation and maintenance of a consolidated data hub, consistent with disclosed embodiments. In some embodiments, elements of system 100 may perform process 1100. For example, as disclosed in the steps description below, data hub 106 may perform process 1100. In particular, ingestion component 110 and data integration/transformation component 114 may perform steps of process 1100. Alternatively, or additionally, other elements of system 100 may perform one or more steps of process 1100. For example, EDW 104 may perform process 1100, or parts of process 1100. Further, in some embodiments system 200 and systems described in architecture 600, or architecture 700, or parts thereof, may perform process 1100. For instance, consolidated data hub in integration stage 630 may perform process 1100 and/or ingestion stage 730, integration stage 740, and consumption stage 750 may implement one or more of the operations in process 1100.

In step 1102, data hub 106 may import data from a plurality of sources. For example, employing EDW 622, EDW interface 624, and/or ingestion layer 632, data hub 106 may import data from source systems 602. As further discussed in connection with FIGS. 6 and 7, in some embodiments the importation of data may be based on monitoring data streams. In other embodiments, the importation of data may be based on querying databases (such as production databases 614 and non-production databases 616) to collect data.

In some embodiments, step 1102 may involve importing to a single location. For example, data imported in step 1102 may be imported to a single EDW 722 or an integration framework 638. Such a single location may be a physical location (e.g., a specific server for imported data) or a virtual location (e.g., a VM running processes and separating memory for a single location). The importation of data in step 1102 may include data in multiple formats and with different types of information. Further, step 1102 may include collection of data through file transfer and/or API controllers that allow an EDW to communicate with elements in source systems. In some embodiments, step 1102 may include the implementation of ELT tools connecting to source data to perform its extraction, transformation, and loading into storage systems in data hub 106.

In some embodiments, data imported in step 1102 may be imported through at least iterative import jobs. Import jobs may include programs for collecting data from different sources through sequences of queries and operations. Iterative jobs in step 1102 may create and update profiles during an import and, for example, rewrite data in a profile if during iterations it is determined that the data has changed. For example: if user X is created early in the import and later on in the same import file, user X has updated attributes, the import job rewrites for the most recent data. The iterative import jobs may be configured for different import formats (e.g., JSON or CVS). Import jobs may also implement logic or on-the-fly data processing. For example, import job may perform operations to delete redundant or already existing files during imports. Import jobs may also include encrypting certain files, tokenizing personal information, or merging files. Further, import jobs in step 1102 may involve multi-threaded imports and generating reports or logs.

In step 1104, data hub 106 may tokenize imported data. As discussed in connection with FIGS. 7 and 8, data hub 106 may perform operations to tokenize imported data before it is aggregated or consolidated in integration and/or consolidation tables. In step 1104, imported data may be tokenized or anonymized by hiding, substituting, deleting, encrypting, or modifying sensitive data element with a non-sensitive equivalent, referred to as a token. Tokenized data may include identifiers that map back to the sensitive data through a tokenization system (e.g., integration framework 638 and/or data integration tools 640). In some embodiments, the tokenization may involve a one-way cryptographic function used to convert the original data into tokens.

In step 1106, data hub 106 may transform imported data into integration and/or consumption tables. For example, data hub 106 may incorporate imported data in objects or other data structures (e.g., SQL tables 635) that generate uniform or standardized objects that aggregate, integrate, and/or consolidate imported data. Objects generated in step 1106 may standardize the information stored and transformed to generate uniform data sources that can be more easily accessed, searched, and utilized for later modeling or analytics in later stages (such as in downstream modeling module 536, consumption layer 636, and/or downstream stage 760). In some embodiments, in step 1106 data hub 106 may transform data to organize it through scripts and/or programing interfaces that capture date in staging area 633 and transform data to tables (e.g., in the object arrangement 800 and object arrangement 900). In some embodiments, as discussed in connection with FIGS. 8 and 9, tables generated in step 1106 may be object tables that are each associated with an indexing key and one or more attributes. Additionally, or alternatively, table objects generated in step 1106 may be associated with metadata that correlates table objects between each other or to categories.

In some embodiments, the transformation of data in step 1106 may involve transforming the imported data by creating an incremental dataset and comparing sources with target dates to eliminate outdated sources. For example, the transformation of data in step 1106 may include modifying object tables by addition or merging attributes according to the conditions provided when configuring the dataset. The incremental datasets may be generated by comparing system sources during transformations to manage states, creating datasets, and generating INSERT (or MERGE) statements to generate object tables.

In step 1108, data hub 106 may determine whether there are outlier attributes in the integration and/or consumption tables. For example, by comparing generated attributes in generated tables with control and/or reference data, data hub 106 may identify outliers through conformity jobs or scripts that compare data in generated tables with control tables 646, reference data 643, and integration framework 638. As discussed above, the determination of outlier attributes may involve comparison of attributes with control tables (e.g., control tables 646) or reference data (e.g., reference data 643). As discussed in connection with FIG. 3, outlier data may also be identified by determining divergent data from the other data points through statistical analysis. Additionally, or alternatively, step 1108 may involve applying conformity or quality rules to identify outliers.

If data hub 106 identifies outlier attributes (step 1108: Yes), data hub 106 may continue to step 1110. If data hub 106 does not identify outlier attributes (step 1108: No), data hub 106 may continue to step 1112.

In step 1110, data hub 106 may modify or delete the outlier attributes. For example, upon determining or identifying outliers, data integration tools 640 may modify attributes to conform with specific ranges (e.g., such as those in reference tables) or delete certain attributes to address outliers. As another example, integration framework 638 and/or integration stage 740, and may perform operations to modify outlier attributes and/or delete them before storing them in integrated database 642 in storage devices or database entities, such as product/asset class entities 742. Operations in step 1110 may involve normalizing or deleting attributes in corresponding tables. The normalization process may improve database efficiency by standardizing the attributes in tables to facilitate comparison and sorting jobs. The normalization may also permit reorganization of object tables and/or the implementation of database defragmentation to improve accessibility. The normalization process may involve steps of forms from the first normal form to 'x' normal form for the normalization implementation. The normalization may allow data hub 106 to arrange data into logical groups such that each group describes a small part of the whole, minimize the amount of duplicated data stored in a database, build a database in which you can access and manipulate the data quickly and efficiently without compromising the integrity of the data storage.

In step 1112, data hub 106 may adjust attributes by comparing table attributes with a control table. In some embodiments, step 1112 may perform the adjustment using a conformity job. As further discussed in connection with FIGS. 6 and 7, the conformity job for adjusting attributes may include comparing attributes with reference data and control tables to determine outliers and adjustment ranges. Conformity jobs in step 1112 may include executions and programs by comparing data in integrated or consolidation tables, against a control table or reference data (e.g., reference data 643, reference data 746, reference category 850). For example, control tables 646 may be used for executing a conformity job that compares tables to identify data completeness (e.g., missing records), identify null attributes, identify outlier data (e.g., data outside a range in control tables 646), identify data truncations, and improper dimensions. In some embodiments, the conformity job may include scripts that apply rules based on control tables 646, reference data 643, and asset class data 639 to modify, delete, or recharacterize data.

In some embodiments, the conformity job in step 1112 may involve implementing or executing a script that adjusts attributes in integration tables based on control tables with matching indexing keys. For example, a conformity job may compare object tables generated in data transformation with control tables by matching their respective indexing keys to determine ranges or parameters for conformity or modification. In such embodiments, the conformity job may involve loading and implementing data norms into the single storage location storing integration tables. Additionally, or alternatively, conformity jobs may include determining irregularities in object attributes, implementing a code change (e.g., updating the assigned value to a specific attribute or adjusting ranges of values assigned to attributes in object tables), and reloading data to impacted attributes. The conformity job may allow writing and enforcing data quality standards (e.g., by manipulating control tables) and enforce those standards without having to repeatedly implement changes through other operations. Accordingly, the implementation of conformity jobs as disclosed would improve the functioning of the computer by minimizing the computing resources used for data qualification or manipulation.

In step 1114, data hub 106 may receive requirements from downstream modeling. For example, in step 1114 data hub 106 may receive certain modeling requirements from downstream users, data hub 106 may receive requirements from downstream users 108. In some embodiments, the modeling requirements may be received through a dashboard, like dashboard 1000. The modeling requirements in step 1114 may specify a type of asset (e.g., for models related to mortgage assets) or a type of evaluation (e.g., models related to monthly extracts, as discussed in connection with FIG. 9).

In step 1116, data hub 106 may generate and store data structures and/or dynamic logs according to the requests received in step 1114. For example, as discussed in connection with FIGS. 8 and 9, in response to downstream request, data hub 106 may generate integration or consolidation tables that are associated among each other to facilitate data modeling or analysis.

In step 1116 data hub 106 may generate objects that facilitate training or analysis of data in a consolidated data hub. For example, when receiving requirements for data modeling for monthly extracts, data hub 106 may generate tables like the ones discussed in connection with FIG. 9, to aggregate relevant data, remove extraneous data, correct outliers, and generate a more uniform dataset for training or analysis purposes. For example, as discussed in connection with FIG. 6, based on requests from downstream users, data hub 106 may generate an integrated database 642 that includes data to be provided for model execution 645 and/or model development & monitoring 647. Additionally, or alternatively, data hub 106 may respond to requests in step 1116 by generating entities during integration stage 740, such as lifecycle entities 744.

The data structures generated in step 1116 may be object tables. Object tables may enable analysis of unstructured data to perform analysis with remote functions or perform inference by using machine learning models. Object tables may use access delegation to decouple access from cloud storage objects and to normalize data formats retrieved from source files. The generation of object table data structures in step 1116 may provide a metadata index over the unstructured data objects in a specified storage. For example, the relationships and classifications discussed in connection with FIGS. 8 and 9 may be stored as part of integration framework 638 to correlate indexing keys. Data objects may also include file content in raw bytes, which is auto populated when the object table is created.

While FIGS. 8 and 9 show data structures shown as object tables, data hub 106 may generate other data structures in step 1116. For example, data hub 106 may generate linear data structures (such as arrays, stacks, linked lists, or queues) in step 1116. Data structures may also generate other non-linear data structures such as trees, graphs, or maps in step 1116. Additionally, or alternatively, data hub 106 may generate dynamic data structures (i.e., structures that can modify dimensions based on usage or type of storage). In some embodiments, the selection of the specific type of data structures is based on requirements received in step 1114. Further, data structures generated in step 1116 may follow different rules for data aggregation, consolidation, and/or integration. For example, in some embodiments data structures may generate with through exclusivity aggregation rules in which data in data structures is unique, distinct from each other. In other embodiments, however, the data in data structures may be overlapping and different data structures may have aggregated the same data, albeit in different attributes or values. In such embodiments, data in two data structures may be the same. Further, some of the rules used for the aggregation of data may be based on or tailored for specific downstream requirements. For example, as disclosed in connection with FIG. 9, data structures may be categorized based on life cycles and/or periodicity (such as monthly extracts).

In some embodiments step 1116 may involve storing the data structures in a single storage location. For example, data hub 106 may store the data structures generated based on downstream modeling requirements in a single location such as integrated database 642. Alternatively, or additionally, data hub 106 may be stored in a single location (e.g., SQL tables 635 or integrated database 642) to consolidate data and facilitate later access. The single location may be configurable to unify transactions and analytics in a single engine to drive low-latency access to large datasets, simplifying the development of fast, modernized enterprise applications.

In some embodiments step 1116 may involve generating and/or maintaining a change log that stores changes in the plurality of integration tables. For example, in generating data structures, data hub 106 may generate change logs that identify changes during the conformity job or the modification steps to the object tables. As further discussed below, change logs storing changes in the object tables may be used to trigger retraining or updates to models that used the dynamic tables. Further, in certain embodiments step 1116 may involve generating data structures based on the requirements received in step 1114. In such embodiments, data hub 106 may receive one or more requirements from a user and filter object tables (e.g., created in step 1106) based on the requirements. For example, if requirements from step 1114 specify a life cycle event (e.g., application, payoff, default, and charge off) the object structures may be arranged according to filters tailored to extract life cycle event information.

In step 1118, data hub 106 may provision data structure. In some embodiments, data hub 106 may provision data by exposing data structures generated in step 1116 through APIs, FTPs, networked drives, or available servers. For example, data hub 106 may provision data structures by exposing them to HTTP or REST APIs. Alternatively, or additionally, data hub 106 may provision data through dashboards or different GUIs, as further discussed in connection with FIG. 10. In some embodiments, step 1118 may be implemented by publication layer 634, which may organize data in entities (such as lifecycle entity 637 or customer entity 641) and expose those memory locations for consumption or downstream use. Additionally, or alternatively, step 1118 may involve the publication of resources by enabling access to specific data archives or data marts and/or providing dashboards or interfaces to manipulate or retrieve data from data hub 106.

In some embodiments, step 1118 may involve also publishing logs created during data consolidation or transformation. For example, in some embodiments, change logs that track changes in object tables may be exposed the to an application programming interface accessible to users for retrieving the two or more data structures. Alternatively, or additionally, logs of transformations, conformity jobs, or import jobs may be exposed through dashboards, such as dashboard 1000.

Moreover, in step 1118 data hub 106 may generate a data dashboard configured to display results of the conformity job, the data dashboard including filtering options for asset class domain and options for lifecycle domain. As discussed in connection with FIG. 10, data hub 106 may generate the dashboard to include options for displaying results of conformity jobs based on risk or control variables, for different assets or asset types. Additionally, or alternatively, the dashboard generated in 1118 may include summary of statistical information (e.g., in indicators like graphic tool 1014). In step 1118 data hub 106 may also transmit instructions to display the data dashboard to a user.

Further, in some embodiments provisioning the data in step 1118 may involve exposing or provisioning data structures for downstream modeling comprises generating persistent tables and exposing them to application programming interfaces accessible to downstream users. Persistent table may include objects that include attributes and indexing tables linked by relationships that are static regardless of changes in underlying source information. In some embodiments, it may be desirable for users to have object tables with a specific cutoff or structure. Persistent tables provide methods that permit implementation of specific functions and are static. In some embodiments, when a persistent object is stored in the database, the values of any of its reference attributes (that is, references to other persistent objects) are stored as literal values that do not change with underlying data. The persistent tables may facilitate certain modeling or analytics tasks and minimize issues with dynamic attributes. For example, exposing persistent tables to users may facilitate training or analysis by providing literal values that are unassociated from other object tables.

In step 1120, data hub 106 may receive data models and/or indicators of data models and store them in local databases for publication, execution, development, or maintenance. For example, downstream users may generate and execute models (e.g., through model developing & monitoring 658 and model execution 654). And in step 1120, data hub 106 may receive the modeled data or model indicators, which may include model execution dataset storage 652 and execution results 656. Additionally, or alternatively, in step 1120 local modeling module 534 may receive data models for model monitoring.

In step 1122, data hub 106 may determine whether tables used in model training have changed. For example, data hub 106 may monitor integration tools or integration databases and determine if data used in training of models received in step 1120 has been modified. Alternatively, or additionally, data hub 106 may monitor change logs to identify object tables with modified attributes. In some embodiments, data integration tools 640 may be used to monitor changes in source systems that then get transferred to integration or consolidation tables via change logs. Changes may include changes in attributes in the integration tables, changes in relationships between tables, changes in categories, or deletion of certain attributes or indexing keys.

If data hub 106 determines that there are no changes in tables used in model training (step 1122: No), data hub 106 may continue provisioning data structures in step 1118 an continue receiving and monitoring data. But if data hub 106 determines that there are changes in tables used in model training (step 1122: Yes), data hub 106 may continue to step 1124.

In step 1124, data hub 106 may retrain or update models. For example, in response to the determination of changes in tables, data hub 106 may adjust or train models to incorporate the changes identified in step 1122. For example, data hub 106 may modify training subroutines and adjust weightings in models. The model retraining in step 1124 may involve manual changes to models, continuous training (CT) in models, and/or trigger-based retraining (involving determining performance thresholds). Model retraining enables the model in production to make the most accurate predictions with the most up-to-date data. In some embodiments, retraining in step 1124 may not change the parameters and variables used in the model, but rather adapt the model to the current data so that the existing parameters give healthier and up-to-date outputs.

Step 1124 may involve offline learning when determining if a concept drift has occurred and the old dataset does not reflect the new environment. Additionally, or alternatively, retraining in step 1124 may involve online learning which involves continuously retraining the model by setting a time window that includes new data and excludes old data.

Therefore, in some embodiments, data hub 106 may facilitate deployment and maintenance of models that are generated from data consolidated in the data hub by performing operations of receiving a downstream data model trained on at least one of the two or more data structures (e.g., in step 1120), determining that at least one of the plurality of integration tables was modified (e.g., in step 1122); and in response to determining at least one of the plurality of integration tables was modified, retraining the data model on modified integration tables (e.g., in step 1124). Such sequence of operations may alleviate problems of maintaining models that are trained through consolidated data by centralizing model development and deployment operations, minimizing network congestion, and facilitating triggered retraining through data consolidation.

The present disclosure has been presented for the purpose of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles “a” and “an” mean “one or more.” Similarly, the use of a plural term does not necessarily denote a plurality unless it is unambiguous in the given context. Words such as “and” or “or” mean “and/or” unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

According to some embodiments, the operations, techniques, and/or components described herein can be implemented by a device or system, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that can incorporate hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems can control and schedule computer processes for execution, perform memory management, provide file system, networking, I/O services, and provide a user interface functionality, such as a graphical user interface (“GUI”), among other things.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

It is intended, therefore, that the specification and examples be considered as example only, with a true scope and spirit being indicated by the following claims and their full scope of equivalents. The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A system for data consolidation comprising:

one or more processors; and one or more storage devices storing instructions that, when executed, configure the one or more processors to perform operations comprising:

importing data from a plurality of sources to a single storage location through at least one iterative import job;

tokenizing one or more elements in the imported data based on a sensitivity of the one or more elements;

transforming the imported data and the tokenized one or more elements into a plurality of integration tables, the plurality of integration tables having an indexing key and an attribute;

identifying integration tables comprising outlier attributes;

modifying the identified integration tables by normalizing or deleting corresponding attributes;

after modifying the identified integration tables, performing a conformity check on the plurality of integration tables by executing a conformity job, the conformity job comprising a script that compares the plurality of integration tables to a control table comprising control data to ensure data completeness and adjusts attributes in the plurality of integration tables based on values in the control table with a matching indexing key;

generating two or more data structures arranging at least a portion of the plurality of integration tables based on downstream modeling requirements, wherein generating the two or more data structures includes maintaining a change log storing changes to the plurality of integration tables, and wherein generating the two or more data structures comprises:

receiving the downstream modeling requirements from a downstream user, the downstream modeling requirements specifying a life cycle event that includes an application stage; and after transforming the imported data and the tokenized one or more elements into the plurality of integration tables, filtering the plurality of integration tables based on the life cycle event to extract data corresponding to the application stage for arranging into at least one of the two or more data structures;

storing the two or more data structures in the single storage location;

provisioning the two or more data structures for downstream modeling;

receiving a downstream data model trained on at least one of the two or more data structures;

determining, by monitoring the change log, that at least one of the plurality of integration tables was modified; and in response to determining at least one of the plurality of integration tables was modified, triggering a retraining of the data model using modified integration tables.

2. The system of claim 1, wherein generating the two or more data structures further includes exposing the change log to an application programming interface accessible to users for retrieving the two or more data structures.

3. The system of claim 1, wherein:

the two or more data structures are distinct from each other and are tailored for specific downstream requirements; and the conformity job comprises: determining irregularities in the attributes including using the control table to identify data outside a range, implementing a code change, reloading data to impacted attributes, and manipulating the control table to enforce data quality standards.

4. The system of claim 3, wherein the data in the two or more data structures is the same.

5. The system of claim 1, wherein the operations further comprise exposing the single storage location to an application programing interface accessible to users for retrieving the two or more data structures, wherein tokenizing the one or more elements in the imported data based on a sensitivity of the one or more elements includes hiding or deleting data.

6. The system of claim 1, wherein the operations further comprise:

generating a data dashboard configured to display results of the conformity job, the data dashboard including filtering options for asset class domain and options for lifecycle domain; and transmitting instructions to display the data dashboard to a user.

7. The system of claim 6, wherein the data dashboard includes a control button configured to trigger displays of live data in the data dashboard.

8. The system of claim 1, wherein transforming the imported data comprises creating an incremental dataset by comparing sources with target dates to eliminate outdated sources;

the integration tables comprise profiling tables and conformity tables, wherein the profiling tables store asset class attributes, and wherein conformity tables store data type attributes; and provisioning the one or more data structures for downstream modeling comprises generating persistent tables and exposing them to application programming interfaces accessible to downstream users.

9. A computer-implemented method for data consolidation comprising:

importing data from a plurality of sources to a single storage location through at least one iterative import job;

tokenizing one or more elements in the imported data based on a sensitivity of the one or more elements;

transforming the imported data and the tokenized one or more elements into a plurality of integration tables, the plurality of integration tables having an indexing key and an attribute;

identifying integration tables comprising outlier attributes;

modifying the identified integration tables by normalizing or deleting corresponding attributes;

after modifying the identified integration tables, performing a conformity check on the plurality of integration tables by executing a conformity job, the conformity job comprising a script that compares the plurality of integration tables to a control table comprising control data to ensure data completeness and adjusts attributes in the plurality of integration tables based on values in the control table with a matching indexing key;

generating two or more data structures arranging at least a portion of the plurality of integration tables based on downstream modeling requirements, wherein generating the two or more data structures includes maintaining a change log storing changes to the plurality of integration tables, and wherein generating the two or more data structures comprises:

receiving the downstream modeling requirements from a downstream user, the downstream modeling requirements specifying a life cycle event that includes an application stage; and after transforming the imported data and the tokenized one or more elements into the plurality of integration tables, filtering the plurality of integration tables based on the life cycle event to extract data corresponding to the application stage for arranging into at least one of the two or more data structures;

storing the two or more data structures in the single storage location;

provisioning the two or more data structures for downstream modeling;

receiving a downstream data model trained on at least one of the two or more data structures;

determining, by monitoring the change log, that at least one of the plurality of integration tables was modified; and in response to determining at least one of the plurality of integration tables was modified, triggering a retraining of the data model using modified integration tables.

10. The method of claim 9, wherein:

generating the two or more data structures further includes exposing the change log to an application programming interface accessible to users for retrieving the two or more data structures.

11. The method of claim 9, wherein:

the two or more data structures are distinct from each other and are tailored for specific downstream requirements; and the conformity job comprises: determining irregularities in the attributes including using the control table to identify data outside a range, implementing a code change, reloading data to impacted attributes, and manipulating the control table to enforce data quality standards.

12. The method of claim 11, wherein the data in the two or more data structures is the same.

13. The method of claim 9, further comprising exposing the single storage location to an application programing interface accessible to users for retrieving the two or more data structures, wherein tokenizing the one or more elements in the imported data based on a sensitivity of the one or more elements includes hiding or deleting data.

14. The method of claim 9, further comprising:

generating a data dashboard configured to display results of the conformity job, the data dashboard including filtering options for asset class domain and options for lifecycle domain; and transmitting instructions to display the data dashboard to a user.

15. The method of claim 14, wherein the data dashboard includes a control button configured to trigger displays of live data in the data dashboard.

16. The method of claim 9, wherein transforming the imported data comprises creating an incremental dataset by comparing sources with target dates to eliminate outdated sources;

the integration tables comprise profiling tables and conformity tables, the profiling tables storing asset class attributes and conformity tables storing data type attributes; and provisioning the one or more data structures for downstream modeling comprises generating persistent tables and exposing them to application programming interfaces accessible to downstream users.

17. A server comprising:

at least one processor;

a storage location connected to the at least one processor; and a remote access card connected to the at least one processor and the storage location, wherein the at least one processor is configured to:

import data from a plurality of sources to the storage location by connecting to the plurality of data sources through the remote access card and implementing a plurality of import jobs;

tokenize one or more elements in the imported data based on a sensitivity of the one or more elements;

transform the imported data and the tokenized one or more elements into a plurality of tables, the plurality of tables having an indexing key and an attribute;

identify tables comprising outlier attributes;

modify the identified tables by normalizing or deleting corresponding attributes;

perform a conformity check on the tables by executing a conformity job, the conformity job comprising a script that compares the plurality of tables to a control table comprising control data to ensure data completeness and adjusts attributes in the plurality of integration tables based on values in the control table with matching indexing key;

generate two or more data structures arranging at least a portion of the plurality of tables based on downstream modeling requirements, wherein generating the two or more data structures includes maintaining a change log storing changes to the plurality of integration tables, and wherein generating the two or more data structures comprises:

receiving the downstream modeling requirements from a downstream user, the downstream modeling requirements specifying a life cycle event that includes an application stage; and after transforming the imported data and the tokenized one or more elements into the plurality of integration tables, filtering the plurality of integration tables based on the life cycle event to extract data corresponding to the application stage for arranging into at least one of the two or more data structures;

store the two or more data structures in the storage location;

expose the one or more data structures for downstream modeling;

receiving a downstream data model trained on at least one of the two or more data structures;

determining, by monitoring the change log, that at least one of the plurality of integration tables was modified; and in response to determining at least one of the plurality of integration tables was modified, triggering a retraining of the data model using modified integration tables.

* * * * *